United States Patent
Palin et al.

(10) Patent No.: US 9,949,204 B2
(45) Date of Patent: Apr. 17, 2018

(54) METHOD, APPARATUS, AND COMPUTER PROGRAM PRODUCT FOR LOW POWER DATA DELIVERY

(71) Applicant: Provenance Asset Group LLC, Essex, CT (US)

(72) Inventors: Arto Palin, Viiala (FI); Jukka Reunamaki, Tampere (FI); Teemu Savolainen, Nokia (FI)

(73) Assignee: Provenance Asset Group LLC, Essex, CT (US)

( * ) Notice: Subject to any disclaimer, the term of this patent is extended or adjusted under 35 U.S.C. 154(b) by 96 days.

(21) Appl. No.: 14/821,167

(22) Filed: Aug. 7, 2015

(65) Prior Publication Data

US 2017/0041868 A1    Feb. 9, 2017

(51) Int. Cl.
*H04W 52/02* (2009.01)
*H04L 5/00* (2006.01)
(Continued)

(52) U.S. Cl.
CPC ....... *H04W 52/0203* (2013.01); *H04L 5/0048* (2013.01); *H04L 45/122* (2013.01);
(Continued)

(58) Field of Classification Search
None
See application file for complete search history.

(56) References Cited

U.S. PATENT DOCUMENTS

| 5,193,216 A | 3/1993 | Davis |
| 5,471,671 A | 11/1995 | Wang et al. |

(Continued)

FOREIGN PATENT DOCUMENTS

| EP | 1187504 | 3/2002 |
| EP | 2015274 | 1/2009 |

(Continued)

OTHER PUBLICATIONS

"Bluetooth Specification version 4.2", Bluetooth SIG, Dec. 2, 2014 (Dec. 2, 2014), XP055359393, Retrieved from the Interernet: URL:https:// www.bluetooth.com/specificatio.ns/adopted-specifications [retrieved on Mar. 28, 2017] * p. 255, paragraph 4.1.4—p. 255, paragraph 4.1.4 *.

(Continued)

*Primary Examiner* — Bunjob Jaroenchonwanit
(74) *Attorney, Agent, or Firm* — Dinsmore & Shohl LLP

(57) ABSTRACT

An example embodiment enhances power savings in a wireless network, where each wireless device has a hop count value indicating how many hops away is one or more central wireless devices. A device determines that it has information to deliver to the one or more central devices. It selects a device of the one or more other wireless devices, the selected device having a smaller hop count value, than the hop count value of the device. It enters a sleep mode based on a known repetition interval of wireless device discovery messages received from the selected device. The device awakes from the sleep mode based on the known repetition interval of wireless device discovery messages of the selected device. It then creates a connection with the selected device and transmitting to the selected device the information for delivery to the one or more central devices via the connection.

20 Claims, 16 Drawing Sheets

(51) Int. Cl.
*H04L 12/733* (2013.01)
*H04W 84/18* (2009.01)

(52) U.S. Cl.
CPC ... *H04W 52/0216* (2013.01); *H04W 52/0225* (2013.01); *H04W 84/18* (2013.01); *Y02B 60/50* (2013.01)

(56) References Cited

U.S. PATENT DOCUMENTS

| | | | |
|---|---|---|---|
| 5,732,347 A | 3/1998 | Bartle et al. | |
| 7,089,298 B2* | 8/2006 | Nyman | H04L 29/12264 |
| | | | 707/999.001 |
| 8,547,867 B2 | 10/2013 | Koo et al. | |
| 8,885,519 B2 | 11/2014 | Aguirre et al. | |
| 9,158,395 B2 | 10/2015 | Park et al. | |
| 2003/0037033 A1* | 2/2003 | Nyman | H04L 29/12264 |
| 2003/0096577 A1* | 5/2003 | Heinonen | H04L 45/02 |
| | | | 455/41.1 |
| 2004/0042413 A1 | 3/2004 | Kawamura et al. | |
| 2004/0215816 A1 | 10/2004 | Hayes et al. | |
| 2005/0278646 A1 | 12/2005 | Liscano et al. | |
| 2006/0240777 A1 | 10/2006 | Ruuska | |
| 2006/0258338 A1 | 11/2006 | Markki et al. | |
| 2006/0267794 A1 | 11/2006 | Lee et al. | |
| 2007/0206660 A1 | 9/2007 | Lifchuk | |
| 2007/0263551 A1 | 11/2007 | Birchler et al. | |
| 2007/0264991 A1 | 11/2007 | Jones et al. | |
| 2008/0013502 A1* | 1/2008 | Clark | G08C 17/00 |
| | | | 370/338 |
| 2008/0056178 A1* | 3/2008 | Alexander | H04L 12/5695 |
| | | | 370/328 |
| 2008/0085702 A1* | 4/2008 | Park | H04W 40/28 |
| | | | 455/422.1 |
| 2008/0107054 A1 | 5/2008 | Parts et al. | |
| 2008/0161026 A1 | 7/2008 | Wiatrowski et al. | |
| 2009/0320098 A1 | 12/2009 | Roberts et al. | |
| 2010/0035567 A1 | 2/2010 | Vin | |
| 2010/0049846 A1 | 2/2010 | Ballette et al. | |
| 2010/0105409 A1 | 4/2010 | Agarwal et al. | |
| 2010/0118727 A1 | 5/2010 | Draves, Jr. et al. | |
| 2010/0118736 A1* | 5/2010 | Chung | H04L 45/20 |
| | | | 370/254 |
| 2010/0244587 A1 | 9/2010 | Tiovola et al. | |
| 2010/0291952 A1 | 11/2010 | Gosset et al. | |
| 2011/0022661 A1 | 1/2011 | Alsina | |
| 2011/0066850 A1 | 3/2011 | Ekberg | |
| 2011/0103428 A1 | 5/2011 | Chan | |
| 2011/0107084 A1 | 5/2011 | Hubner et al. | |
| 2011/0126009 A1 | 5/2011 | Camp, Jr. et al. | |
| 2011/0126014 A1 | 5/2011 | Camp, Jr. et al. | |
| 2011/0191438 A1 | 8/2011 | Huibers et al. | |
| 2011/0191823 A1 | 8/2011 | Huibers | |
| 2011/0210831 A1 | 9/2011 | Talty et al. | |
| 2011/0222449 A1* | 9/2011 | Goldberg | H04Q 9/00 |
| | | | 370/311 |
| 2011/0263202 A1 | 10/2011 | Lee et al. | |
| 2011/0281519 A1 | 11/2011 | Reuss et al. | |
| 2011/0319020 A1 | 12/2011 | Desai et al. | |
| 2011/0319022 A1 | 12/2011 | Arad et al. | |
| 2012/0289157 A1 | 11/2012 | Palin et al. | |
| 2012/0289158 A1 | 11/2012 | Palin et al. | |
| 2012/0289160 A1 | 11/2012 | Palin et al. | |
| 2013/0065584 A1 | 3/2013 | Lyon et al. | |
| 2013/0138786 A1 | 5/2013 | Ji et al. | |
| 2013/0217332 A1 | 8/2013 | Altman et al. | |
| 2013/0223229 A1 | 8/2013 | Hui et al. | |
| 2013/0260688 A1 | 10/2013 | Palin et al. | |
| 2014/0018002 A1 | 1/2014 | Jose et al. | |
| 2014/0073244 A1 | 3/2014 | Ko et al. | |
| 2014/0092749 A1* | 4/2014 | Hui | H04L 45/121 |
| | | | 370/238 |
| 2014/0153444 A1* | 6/2014 | Zhou | H04W 40/12 |
| | | | 370/256 |
| 2014/0254426 A1* | 9/2014 | Abraham | H04W 48/10 |
| | | | 370/254 |
| 2014/0380159 A1 | 12/2014 | Reilly et al. | |
| 2015/0026306 A1* | 1/2015 | Moon | H04L 67/10 |
| | | | 709/219 |
| 2015/0135087 A1 | 5/2015 | Verkasalo | |
| 2015/0193198 A1 | 7/2015 | Hutchings et al. | |
| 2015/0256954 A1 | 9/2015 | Carlsson et al. | |
| 2015/0264139 A1* | 9/2015 | Son | H04L 67/1002 |
| | | | 709/208 |
| 2015/0304209 A1* | 10/2015 | Choudhury | H04L 45/026 |
| | | | 370/255 |
| 2015/0319078 A1* | 11/2015 | Lee | H04L 12/6418 |
| | | | 370/392 |
| 2015/0341876 A1* | 11/2015 | Abraham | H04W 56/001 |
| | | | 370/509 |
| 2015/0373083 A1 | 12/2015 | Geurts et al. | |
| 2015/0379114 A1* | 12/2015 | Onishi | G06F 13/00 |
| | | | 707/737 |
| 2016/0072573 A1* | 3/2016 | Tohzaka | H04B 7/15507 |
| | | | 370/315 |
| 2016/0099758 A1* | 4/2016 | Bell | H02J 7/0027 |
| | | | 307/104 |
| 2016/0112947 A1* | 4/2016 | Sahoo | H04W 4/008 |
| | | | 370/311 |
| 2016/0337995 A1* | 11/2016 | Chae | H04W 56/001 |
| 2016/0360345 A1* | 12/2016 | Kim | H04W 8/005 |
| 2016/0381497 A1* | 12/2016 | Wan | H04W 8/005 |
| | | | 455/456.2 |
| 2017/0012694 A1* | 1/2017 | Kaku | H04B 7/14 |
| 2017/0026282 A1* | 1/2017 | Huang | H04L 45/122 |
| 2017/0034799 A1* | 2/2017 | Kim | H04W 56/003 |

FOREIGN PATENT DOCUMENTS

| | | |
|---|---|---|
| EP | 1418781 | 6/2012 |
| KR | 20110032370 | 3/2011 |
| WO | WO2005091573 | 9/2005 |

OTHER PUBLICATIONS

Greg Stewart: "Can BLE advertise while being connected?", TI E2E Community—Bluetooth low energy Forum, Nov. 20, 2014 (Nov. 20, 2014), XP002769355, Retrieved from the Internet: URL:https://e2e.ti.com/support/wireless_connectivity/bluetooth_low_energy/f/538/t/383746 [retrieved on Apr. 19, 2017] * the whole document *.
European Search Report completed Apr. 24, 2017 for Application No. EP 17 15 4094.
2.3 Advertising Channel PDU, Link Layer Specification, Bluetooth Specification Version 4.2 [vol. 6, Part B], pp. 39-45, Dec. 2, 2014.

* cited by examiner

SCANNER DEVICE 100

FIG. 10A
SCANNER DEVICE 100

1000

Step 1002: determining, by an apparatus, that it has information to deliver to one or more central wireless devices in a wireless network that includes one or more other wireless devices;

Step 1004: selecting, by the apparatus, a wireless device of the one or more other wireless devices, the selected wireless device having a smaller hop count from the one or more central wireless devices, than a hop count of the apparatus from the one or more central wireless devices;

Step 1006: entering, by the apparatus, a sleep mode based on a known repetition interval of wireless device discovery messages received from the selected wireless device;

Step 1008: awaking, by the apparatus, from the sleep mode based on the known repetition interval of wireless device discovery messages of the selected wireless device; and

Step 1010: creating, by the apparatus, a connection with the selected wireless device and transmitting to the selected wireless device the information for delivery to the one or more central wireless devices via the connection.

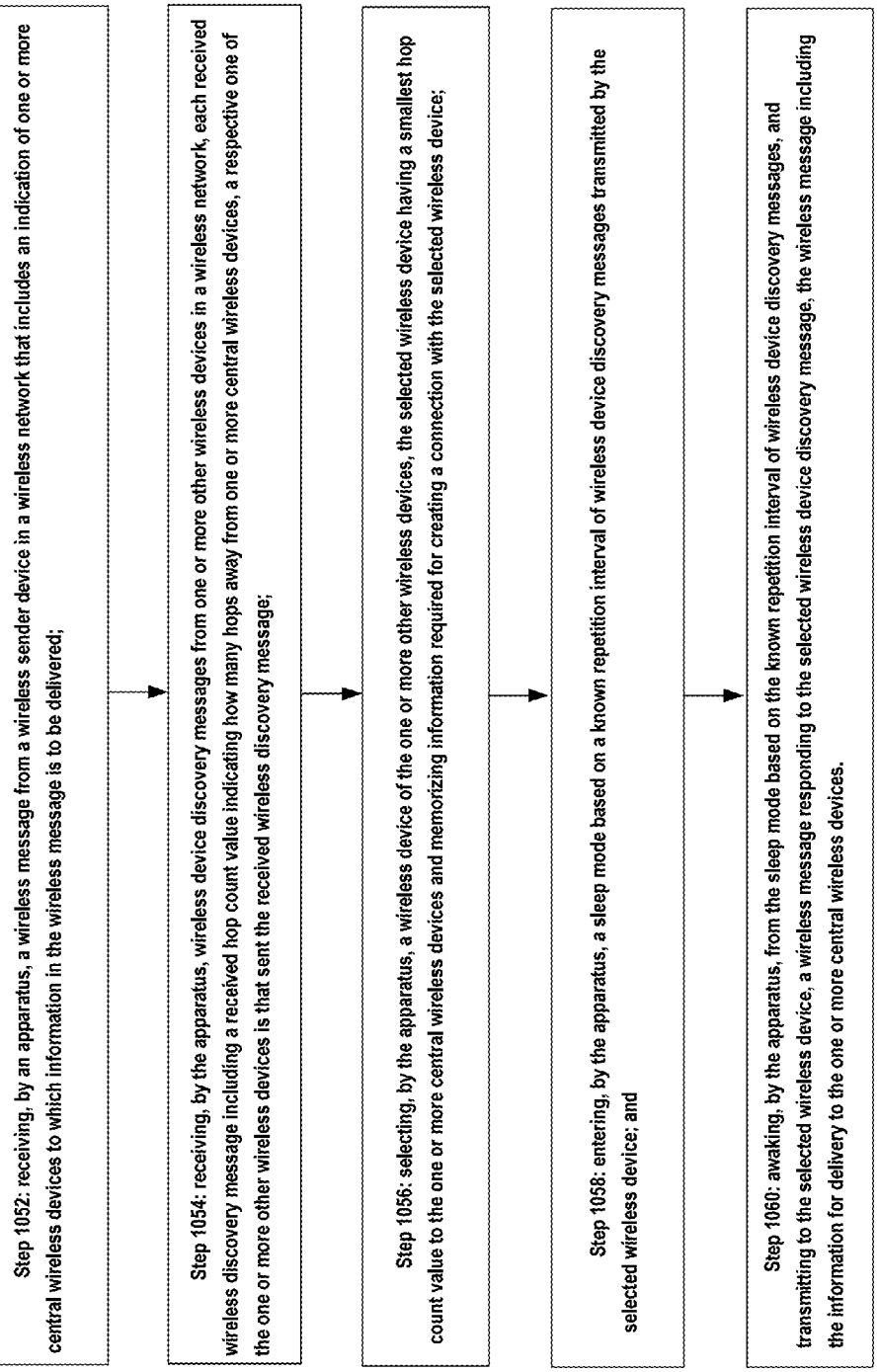

FIG. 10C
GATEWAY DEVICE 106

1080

Step 1082: receiving, by an apparatus, wireless device discovery messages from one or more other wireless devices in a wireless network, each received wireless discovery message including a maximum hop count value indicating how many hops away from the apparatus, a respective one of the one or more other wireless devices is that sent the received wireless discovery message;

Step 1084: selecting, by the apparatus, a wireless device of the one or more other wireless devices, the selected wireless device having a highest RSSI level for wireless device discovery messages received from the selected wireless device; and Step 1086: transmitting, by the apparatus, an indication to the selected wireless device, indicating that the selected wireless device is closest to the apparatus of the one or more other wireless devices in the wireless network, the indication causing the selected wireless device to store a hop count of one therein, indicating there is one wireless connection required to deliver data to the apparatus.

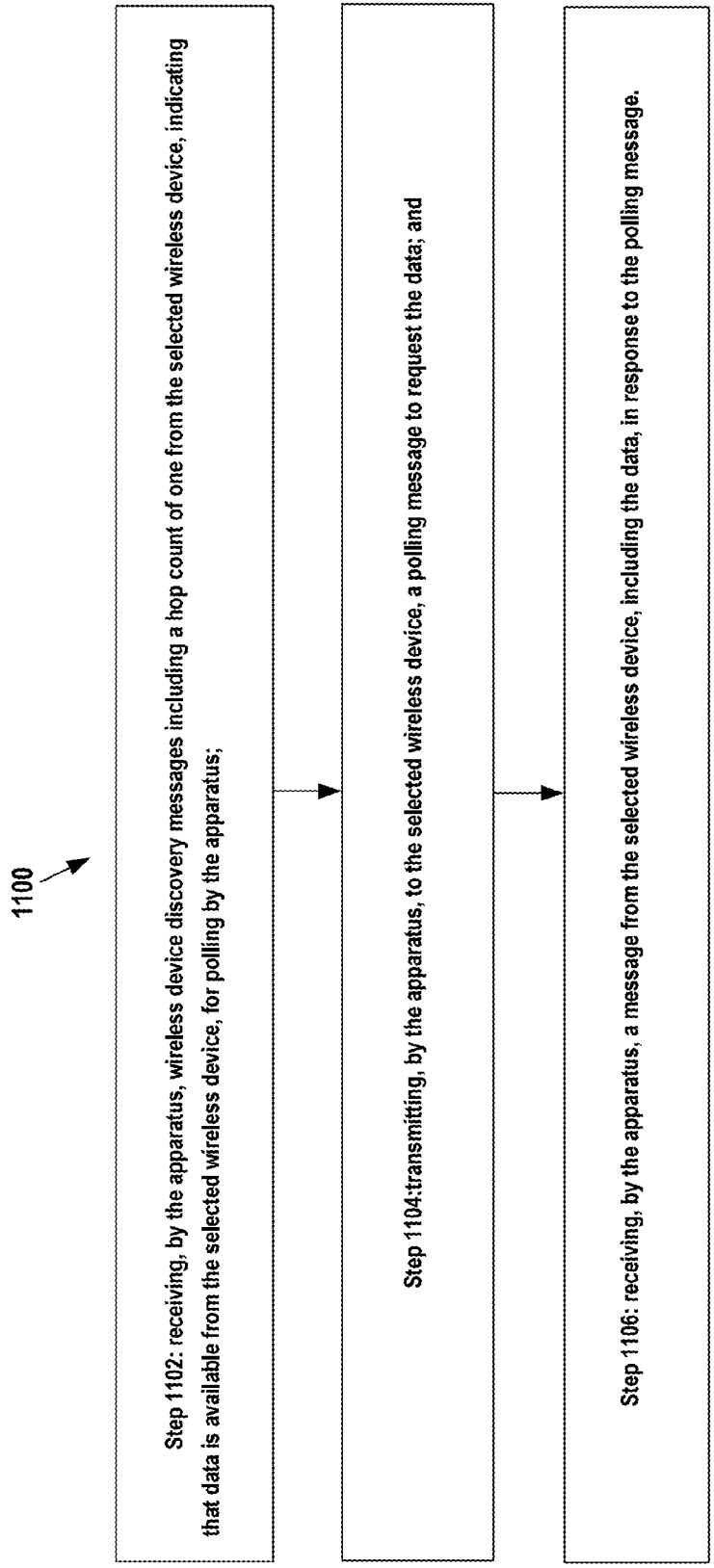

METHOD, APPARATUS, AND COMPUTER PROGRAM PRODUCT FOR LOW POWER DATA DELIVERY

FIELD

The technology field relates to wireless device features for enhanced power savings in a wireless network, such as a wireless mesh network.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ *Core Specification, Version* 4.2, Bluetooth™ SIG, Dec. 2, 2014 (incorporated herein by reference), describes the Bluetooth™ protocol (BT) and the Bluetooth™ Low Energy protocol (BLE).

SUMMARY

Method, apparatus, and computer program product example embodiments of wireless device features for enhanced power savings in a wireless network, such as a wireless mesh network.

An example embodiment of the invention includes a method comprising:

receiving, by an apparatus, wireless device discovery messages from one or more other wireless devices in a wireless network, each received wireless discovery message including a received hop count value indicating how many hops away from one or more central wireless devices, a respective one of the one or more other wireless devices is that sent the received wireless discovery message;

memorizing, by the apparatus, a smallest hop count value indicated in the received wireless device discovery messages; and transmitting, by the apparatus, wireless device discovery messages including a transmitted hop count value of the apparatus, which is one greater than the smallest hop count value, indicating how many hops away the apparatus is from one or more central wireless devices.

An example embodiment of the invention includes a method comprising:

memorizing, by the apparatus, the smallest hop count value indicated in the received wireless device discovery messages, if an RSSI value of the received wireless device discovery messages is greater than a threshold value.

An example embodiment of the invention includes a method comprising:

adjusting, by the apparatus, the hop count value of the apparatus in response to a change in how many hops away the apparatus is from the one or more central wireless devices.

An example embodiment of the invention includes a method comprising:

determining, by the apparatus, that it has information to deliver to the one or more central wireless devices;

selecting, by the apparatus, a wireless device of the one or more other wireless devices, the selected wireless device having a smaller hop count value, than the hop count value of the apparatus;

entering, by the apparatus, a sleep mode based on a known repetition interval of wireless device discovery messages received from the selected wireless device;

awaking, by the apparatus, from the sleep mode based on the known repetition interval of wireless device discovery messages of the selected wireless device; and creating, by the apparatus, a connection with the selected wireless device and transmitting to the selected wireless device the information for delivery to the one or more central wireless devices via the connection.

An example embodiment of the invention includes a method comprising:

determining, by an apparatus, that it has information to deliver to one or more central wireless devices in a wireless network that includes one or more other wireless devices;

selecting, by the apparatus, a wireless device of the one or more other wireless devices, the selected wireless device having a smaller hop count from the one or more central wireless devices, than a hop count of the apparatus from the one or more central wireless devices;

entering, by the apparatus, a sleep mode based on a known repetition interval of wireless device discovery messages received from the selected wireless device;

awaking, by the apparatus, from the sleep mode based on the known repetition interval of wireless device discovery messages of the selected wireless device; and creating, by the apparatus, a connection with the selected wireless device and transmitting to the selected wireless device the information for delivery to the one or more central wireless devices via the connection.

An example embodiment of the invention includes a method comprising:

the apparatus wirelessly connects to the selected wireless device after awaking from the sleep mode, and then transmits to the selected wireless device.

An example embodiment of the invention includes a method comprising:

wherein the known repetition interval of wireless device discovery messages transmitted by the selected wireless device, is at least one of: an advertisement interval received in the advertising messages, an interval indicated by an AD type of the advertising message, an interval preconfigured in the apparatus' memory, or an interval detected during a previous discovery process or connection phase.

An example embodiment of the invention includes a method comprising:

wherein the selecting of the selected wireless device further includes selecting a wireless device with a smallest hop count, if an RSSI of that device satisfies a predetermined threshold.

An example embodiment of the invention includes a method comprising:

wherein if the hop count of the apparatus is one to the one or more central wireless devices, then transmitting one or more device discovery messages indicating the information is available for polling by the one or more central wireless devices.

An example embodiment of the invention includes an apparatus comprising:

at least one processor;

at least one memory including computer program code;

the at least one memory and the computer program code configured to, with the at least one processor, cause the apparatus at least to:

receive wireless device discovery messages from one or more other wireless devices in a wireless network, each received wireless discovery message including a received hop count value indicating how many hops away from one or more central wireless devices, a respective one of the one or more other wireless devices is that sent the received wireless discovery message;

memorize a smallest hop count value indicated in the received wireless device discovery messages; and transmit wireless device discovery messages including a transmitted hop count value of the apparatus, which is one greater than the smallest hop count value, indicating how many hops away the apparatus is from one or more central wireless devices.

An example embodiment of the invention includes an apparatus comprising:

the at least one memory and the computer program code configured to, with the at least one processor, cause the apparatus at least to:

memorize the smallest hop count value indicated in the received wireless device discovery messages, if an RSSI value of the received wireless device discovery messages is greater than a threshold value.

An example embodiment of the invention includes an apparatus comprising:

the at least one memory and the computer program code configured to, with the at least one processor, cause the apparatus at least to:

determine that the apparatus has information to deliver to the one or more central wireless devices;

select a wireless device of the one or more other wireless devices, the selected wireless device having a smaller hop count value, than the hop count value of the apparatus;

enter a sleep mode based on a known repetition interval of wireless device discovery messages received from the selected wireless device;

awake from the sleep mode based on the known repetition interval of wireless device discovery messages of the selected wireless device; and create a connection with the selected wireless device and transmit to the selected wireless device the information for delivery to the one or more central wireless devices via the connection.

An example embodiment of the invention includes an apparatus comprising:

at least one processor;

at least one memory including computer program code;

the at least one memory and the computer program code configured to, with the at least one processor, cause the apparatus at least to:

determine that the apparatus has information to deliver to one or more central wireless devices in a wireless network that includes one or more other wireless devices;

select a wireless device of the one or more other wireless devices, the selected wireless device having a smaller hop count from the one or more central wireless devices, than a hop count of the apparatus from the one or more central wireless devices;

enter a sleep mode based on a known repetition interval of wireless device discovery messages received from the selected wireless device;

awake from the sleep mode based on the known repetition interval of wireless device discovery messages of the selected wireless device; and create a connection with the selected wireless device and transmit to the selected wireless device the information for delivery to the one or more central wireless devices via the connection.

An example embodiment of the invention includes an apparatus comprising:

the apparatus wirelessly connects to the selected wireless device after awaking from the sleep mode, and then transmits to the selected wireless device.

An example embodiment of the invention includes an apparatus comprising:

wherein the known repetition interval of wireless device discovery messages transmitted by the selected wireless device, is at least one of: an advertisement interval received in the advertising messages, an interval indicated by an AD type of the advertising message, an interval preconfigured in the apparatus' memory, or an interval detected during a previous discovery process or connection phase.

An example embodiment of the invention includes an apparatus comprising:

wherein the selecting of the selected wireless device further includes selecting a wireless device with a smallest hop count, if an RSSI of that device satisfies a predetermined threshold.

An example embodiment of the invention includes an apparatus comprising:

wherein if the hop count of the apparatus is one to the one or more central wireless devices, then transmitting one or more device discovery messages indicating the information is available for polling by the one or more central wireless devices.

An example embodiment of the invention includes a computer program product comprising computer executable program code recorded on a computer readable non-transitory storage medium, the computer executable program code comprising:

code for receiving, by an apparatus, wireless device discovery messages from one or more other wireless devices in a wireless network, each received wireless discovery message including a received hop count value indicating how many hops away from one or more central wireless devices, a respective one of the one or more other wireless devices is that sent the received wireless discovery message;

code for memorizing, by the apparatus, a smallest hop count value indicated in the received wireless device discovery messages; and code for transmitting, by the apparatus, wireless device discovery messages including a transmitted hop count value of the apparatus, which is one greater than the smallest hop count value, indicating how many hops away the apparatus is from one or more central wireless devices.

An example embodiment of the invention includes a computer program product comprising:

code for memorizing, by the apparatus, the smallest hop count value indicated in the received wireless device discovery messages, if an RSSI value of the received wireless device discovery messages is greater than a threshold value.

An example embodiment of the invention includes a computer program product comprising computer executable program code recorded on a computer readable non-transitory storage medium, the computer executable program code comprising:

code for determining, by an apparatus, that it has information to deliver to one or more central wireless devices in a wireless network that includes one or more other wireless devices;

code for selecting, by the apparatus, a wireless device of the one or more other wireless devices, the selected wireless device having a smaller hop count from the one or more central wireless devices, than a hop count of the apparatus from the one or more central wireless devices;

code for entering, by the apparatus, a sleep mode based on a known repetition interval of wireless device discovery messages received from the selected wireless device;

code for awaking, by the apparatus, from the sleep mode based on the known repetition interval of wireless device discovery messages of the selected wireless device; and code for creating, by the apparatus, a connection with the selected wireless device and transmitting to the selected wireless device the information for delivery to the one or more central wireless devices via the connection.

DESCRIPTION OF THE FIGURES

FIG. 10A is an illustration of an example flow diagram of an example process in the wireless scanner device, carrying out the example operations, in accordance with at least one embodiment of the present invention.

FIG. 10B is an illustration of an example flow diagram of an example process in the wireless advertiser device, carrying out the example operations, in accordance with at least one embodiment of the present invention.

FIG. 10C is an illustration of an example flow diagram of an example process in the wireless gateway (GW), carrying out the example operations, in accordance with at least one embodiment of the present invention.

FIG. 10D is an illustration of an example flow diagram of an example process in the wireless gateway (GW) or node, carrying out the example operations, in accordance with at least one embodiment of the present invention.

DISCUSSION OF EXAMPLE EMBODIMENTS OF THE INVENTION

Figure 1B:
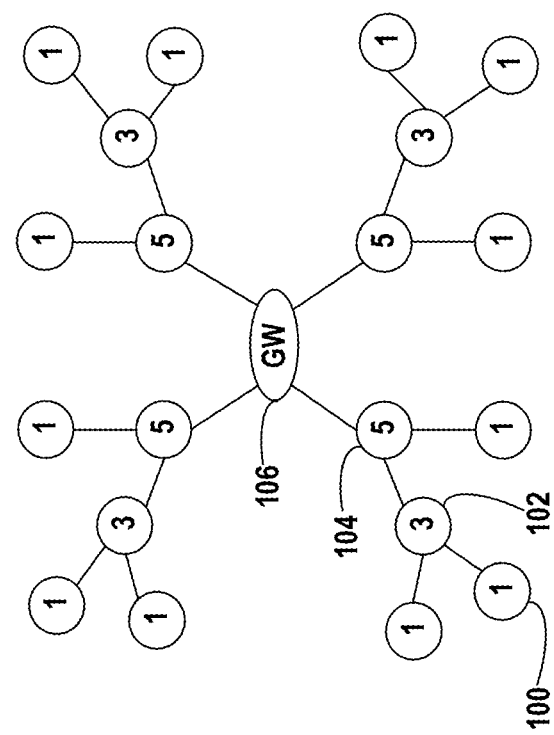
FIG. 1B is an example wireless network, such as a wireless mesh network, illustrating how many nodes have their data traversing through a node.

This section is organized into the following topics:
A. Wireless Short-Range Communication Networks
B. Bluetooth™ Low Energy (BLE) Technology
C. Wireless mesh networks
D. Low Power Data Delivery

A. Wireless Short-Range Communication Networks

Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (BLE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (BLE) Technology

The Bluetooth™ Core Specification, Version 4.2 includes the Bluetooth LE protocol for products that require lower power consumption, lower complexity, and lower cost than would be possible using the BR/EDR protocol. Bluetooth LE is designed for applications requiring a very-low power idle and active modes. These applications typically produce data with low data rates and/or have only small amount of data to be exchange during the active connection or in the idle mode. Bluetooth LE provides a simple device discovery, short duty cycles, and low overhead in data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer may have multiple instances of the Link Layer state machine. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Bluetooth Basic Rate/Enhanced Data Rate (BR/EDR) radio. Bluetooth LE supports very short data packets, from 10 octets to a maximum of 265 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.2, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

In the Bluetooth™ Core Specification, Version 4.2, the initiator device receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.2, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification Version 4.2, Bluetooth LE device discovery involves different operational processes for devices with different roles. In particular:

Advertiser device performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Scanner device performs the scanning process. A scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to several years such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel, which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection is initiated. Once a connection is established, the initiator becomes the master device in a piconet and the advertising device becomes the slave device. Connection events are used to send data packets between the master and slave devices.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (http://standardsleee.org/regauth/oui/forms/and sections 9 and 9.1 of the IEEE 802-2001 specification).

The public device address is divided into the following two fields:
company assigned field is contained in the 24 least significant bits
company id field is contained in the 24 most significant bits.

For the purposes of this profile, the random device address may be of either of the following two sub-types:
Static address
Private address The private address may be of either of the following two sub-types:
Non-resolvable private address
Resolvable private address Static and non-resolvable private address both contains address that is random. The main difference is that the device shall not change its static address value once initialized until the device is power cycled.

The random resolvable private device address is divided into the following two fields which can be used to identify the device:

hash field is contained in the 24 least significant bits, as defined in Bluetooth™ Core Specification, Version 4.2 [Vol. 6] Part B, Section 1.3.2.2.
random field is contained in the 24 most significant bits, as defined in Bluetooth™ Core Specification, Version 4.2 [Vol. 6] Part B, Section 1.3.2.2.

2. Bluetooth™ LE Link Layer Security a. Authorization

In a Bluetooth LE (BLE) connection authorization, a user of a Bluetooth device may grant a specific (remote) Bluetooth device access to a specific service. Authorization implies that the identity of the remote device can be verified through authentication. It is the act of granting a specific Bluetooth device access to a specific service. It may be based upon user confirmation, or given the existence of a trusted relationship. A service may require authorization before allowing access. Authorization is a confirmation by the user to continue with the procedure. Authentication does not necessarily provide authorization. Authorization may be granted by user confirmation after successful authentication. Authentication and authorization may be defined by a higher layer specification or be implementation specific.

b. Authentication and Encryption

Authentication is a generic procedure based on LMP-authentication if a link key exists or on LMP-pairing if no link key exists. LMP-authentication is an LMP level procedure for verifying the identity of a remote device. The procedure is based on a challenge-response mechanism using a random number, a secret key and the BD_ADDR of the non-initiating device. The secret key used can be a previously exchanged link key.

The Link Layer provides encryption and authentication using Counter with Cipher Block Chaining-Message Authentication Code (CCM) Mode, which shall be implemented consistent with the algorithm as defined in IETF RFC 3610 in conjunction with the AES-128 block cipher as defined in NIST Publication FIPS-197. The Link Layer connection may be either encrypted and authenticated or unencrypted and unauthenticated. In an encrypted and authenticated connection, all the Data Channel PDUs with a non-zero length Payload shall be encrypted and authenticated. Authentication is performed by appending a Message Integrity Check (MIC) field to the Payload.

c. Pairing and Bonding

LMP-pairing is a procedure that authenticates two devices, based on a PIN, and subsequently creates a common link key that can be used as a basis for a trusted relationship or a (single) secure connection. The procedure consists of the steps: creation of an initialization key (based on a random number and a PIN), creation and exchange of a common link key and LMP-authentication based on the common link key.

Bonding is a dedicated procedure for performing the first authentication, where a common link key is created and stored for future use. Trusting is the marking of a paired device as trusted. Trust marking can be done by the user, or automatically by the device (e.g. when in bondable mode) after a successful pairing.

Pairing and key distribution over a BLE physical link is defined by the Security Manager specification (Bluetooth™ Core Specification, Version 4.2 [Vol. 3], Part H Section 2.3). The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.
2. Connection Signature Resolving Key (CSRK) is a 128-bit key used to sign data and verify signatures on the receiving device.
3. Long Term Key (LTK) is a 128-bit key used to generate the contributory session key for an encrypted connection. Link Layer encryption is described in Bluetooth™ Core Specification, Version 4.2 [Vol 6] Part B, Section 5.1.3.
4. Encrypted Diversifier (EDIV) is a 16-bit stored value used to identify the LTK. A new EDIV is generated each time a unique LTK is distributed.
5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Vol. 6] Part B, Section 1.3.2.2). A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.2 [Vol. 3], Part H Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled, the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

3. Bluetooth LE Timing in the Advertising, Scanning, and Initiator States:

a. Bluetooth LE Advertising State:

For all undirected advertising events or connectable directed advertising events used in a low duty cycle mode, the time between the start of two consecutive advertising events (T_advEvent) is computed as follows for each advertising event:

$$T\_advEvent = advInterval + advDelay$$

The advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event. Bluetooth™ Core Specification, Version 4.2, [Vol. 6] FIG. 4.1 shows an example timing diagram of advertising events perturbed in time using advDelay.

b. Bluetooth LE Scanning State:

If the advertiser receives a SCAN_REQ PDU that contains its device address from a scanner allowed by the advertising filter policy, it shall reply with a SCAN_RSP PDU on the same advertising channel index. After the SCAN_RSP PDU is sent, or if the advertising filter policy prohibited processing the SCAN_REQ PDU, the advertiser shall either move to the next used advertising channel index to send another ADV_IND PDU, or close the advertising event. Bluetooth™ Core Specification, Version 4.2, [Vol. 6] FIG. 4.3 shows an example timing diagram of a connectable undirected advertising event with SCAN_REQ and SCAN_RESP PDUs in the middle of an advertising event.

c. Bluetooth LE Initiator State and Connection Setup:

If an initiator sends the advertiser receives a CONNECT_REQ PDU that contains the advertiser's device address, and the initiator is allowed by the advertising filter policy, the Link Layer of the advertiser shall exit the Advertising State and transition to the Connection State in the Slave Role. If the advertising filter policy prohibited processing the received CONNECT_REQ PDU, the advertiser shall either move to the next used advertising channel index to send another ADV_IND PDU, or close the advertising event. Bluetooth™ Core Specification, Version 4.2, [Vol. 6] FIGS. 4.13 and 4.14 show example timing diagrams of a Connection setup C. Wireless Mesh Networks Wireless mesh networks are dynamically self-organized and self-configured, with wireless nodes in the network automatically establishing an ad hoc network and maintaining the mesh connectivity. Through multi-hop communications, the same coverage can be achieved by a mesh node with much lower transmission power. A wireless mesh network may be a mobile ad-hoc network created using short-range wireless technology such as Bluetooth™ protocol (BT) or the Bluetooth™ Low Energy protocol (BLE). Within the wireless mesh network, each wireless node may be mobile and is within communication range of other wireless nodes. The topology of the wireless mesh network may change as the position of one or more of the wireless nodes changes. The wireless nodes in a wireless mesh network are typically always powered on, to handle the control signaling necessary in propagating multi-hop communications, which creates a significant drain on batteries powering the mobile nodes.

D. Low Power Data Delivery

One application for wireless networks, such as wireless mesh networks, is for low power data collection by a Gateway Device (GW Device) or access point, collecting sensed data from an array of low power sensors arranged in the wireless network. Example use cases include smart metering, where the measurement information at each sensor node may be transmitted in multi-hop fashion, to the GW. A hop count is the number of wireless connections required to deliver data to the GW. The sensors may be in fixed position or mobile and may operate on battery power, which must be conserved during long periods of inactivity punctuated by short intervals of communication sessions.

Figure 1A:
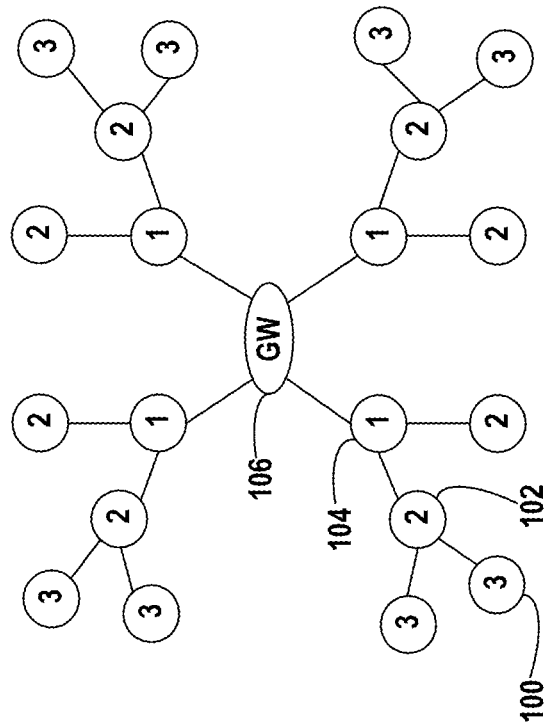
FIG. 1A is an example wireless network, such as a wireless mesh network, wherein the nodes are labeled with their number of hops distance from the Gateway Device (GW).

FIG. 1A shows an example wireless network, such as a wireless mesh network, wherein the nodes are labeled with the number of hops they are distant from the Gateway Device (GW). For example, node 100 is three hops from the GW 106, node 102 is two hops from the GW 106, and node 104 is one hop from the GW 106. (The GW is labeled as being at hop 0.)

FIG. 1B shows an example wireless network, wireless network, such as a wireless mesh network, illustrating how many nodes at outer positions, and the inner node itself, have their data traversing through the inner node. The nearer a node is to GW, the greater is the amount of data from other nodes traversing through the node, showing that a node's power consumption increases the nearer the node is to a GW. For example node 100 is three hops from the GW 106 and has only its own data generated in it. Node 102 is two hops from the GW 106 and has its own data plus the data from node 100 passing through it. Node 104 is one hop from the GW 106 and has its own data plus the data from both node 100 and node 102 passing through it. It is clear that data volumes, and power consumption, increase quickly the nearer a node is to a GW. Hence, a problem is how to optimize power consumption of every node, and in particular of those burdened nodes near to a GW.

Oftentimes, for communications, both source and destination identifiers, such as addresses, are included in every packet transmitted between wireless mesh nodes. The communication of the its required for both source and destination identifiers consumes precious power, and hence transmitting these identifiers all the time, is a problem in mesh networks. For generic mesh networks, other problems include how to find routes between any individual nodes in the mesh.

In accordance with an example embodiment of the invention, the GW is programmed to process the data it receives from the low power sensors in the wireless network, based on an identification of the originator node, which is included in the data.

In accordance with an example embodiment of the invention, when a node is started, it must self-organize itself in the mesh network by establishing its location in the mesh network with respect to the location of the GW, by establishing the number of hops distance from the GW. To do this, the node performs a device discovery and/or connection creation procedure and memorizes the smallest hop number found in received advertisements from other nodes in the wireless network. In Bluetooth LE device discovery, the node scans for BLE advertising packets transmitted from other BLE nodes in the mesh network. The node performing the device discovery may additionally have other requirements, such as the received discovery message having a sufficiently high RSSI value. At this point the node does not create a connection to any other node.

In accordance with an example embodiment of the invention, continuing with the self-organization, the node will start to periodically transmit its own advertising packets with a hop number that is one greater than the smallest hop number it has received in the discovery messages from other devices in the network. If the node did not receive any advertising packets having hop number less than a maximum hop number, for example a maximum hop count value of 15, it will transmit advertising packets with the maximum hop number. In one sense this procedure will create a tree topology, but in such a way that no node keeps knowledge of the topology or is actually connected to any other node. The node may also periodically rediscover the environment, and as a result of the discovery procedure, may adjust its hop number to reflect a new state (changes may occur due node movement or node disconnections). A node not being connected to by any GW will advertise a maximum hop number, such as 15, until a GW device becomes available to configure the node's hop count to 1, or until the node receives an advertisement with a hop count value smaller than the maximum. If a set of nodes are deployed in an area without a GW, they all will advertise the maximum hop count and no data will flow between nodes.

Figure 2A:
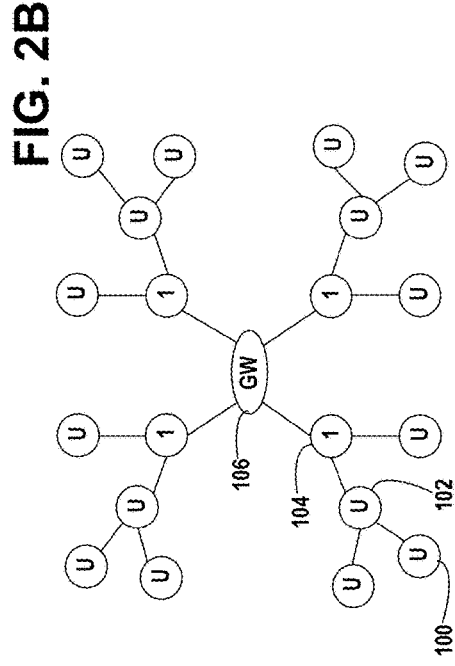
FIG. 2A is an example wireless network, such as a wireless mesh network, wherein a GW is initially placed in the wireless network when the nodes are uninitialized, as indicated by the label "U".

FIGS. 2A to 2D show an example of a wireless network, such as a wireless mesh network, dynamically self-organizing and self-configuring, wherein the wireless nodes in the network automatically establish an ad hoc network and maintain the mesh connectivity, in accordance with an example embodiment of the invention. FIG. 2A is an example wireless network, wherein a GW node 106 is initially placed in the wireless network when the nodes are uninitialized, as indicated by the label "U". For example node 100, node 102, and node 104 are all labeled "U", since they are uninitialized before the introduction of GW. The uninitialized nodes will have a maximum value hop count, for example 15, which they transmit in advertising packets. The GW node 106 will scan for and discover the nearest nodes, such as node 104 sending advertisement packets with the maximum hop count of 15. The GW may determine the proximity of another node by the RSSI of its advertising packet. For all nodes in GW's vicinity, the GW may write a new hop count, such as one, to tell the nodes that they are next to a GW.

The GW node 106 receives advertising packets from one or more other wireless devices node 100, node 102, and node 104, each received advertising packet including a maximum hop count value indicating how many hops away from the GW node 106, a respective one of the one or more other wireless devices is that sent the received advertising packet.

The GW node 106 selects a wireless device, for example node 104, of the one or more other wireless devices, the selected wireless device having a highest RSSI level for advertising packets received from the selected wireless device.

The GW node 106 transmits an indication to the selected wireless device node 104, indicating that the selected wireless device is closest to the GW node 106 of the one or more other wireless devices in the wireless network. The indication causes the selected wireless device node 104 to store a hop count of one therein, indicating there is one wireless connection required to deliver data to the GW node 106.

Figure 2B:
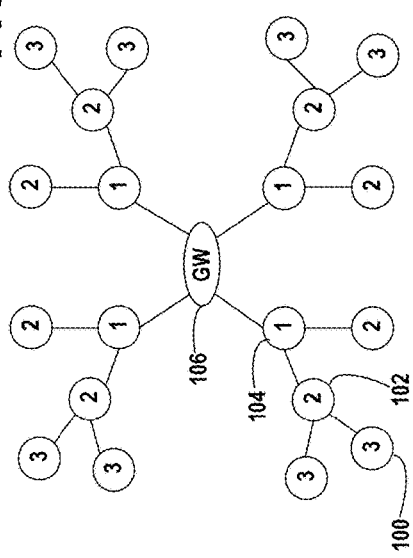
FIG. 2B is an example of the wireless network of FIG. 2A, wherein the GW will discover the nearest nodes, such as node 104, sending advertisements. For all nodes in GW's vicinity, the GW will write a new hop count, such as one, to tell the nodes that they are next to a GW.

FIG. 2B is an example of the wireless network of FIG. 2A, wherein the GW will discover the nearest nodes, such as node 104, sending advertisements. For all nodes in GW's vicinity, the GW will write a new hop count, such as one, to tell the nodes that they are next to a GW. The edges between the nodes illustrate data flow paths, not active connections.

Figure 2C:
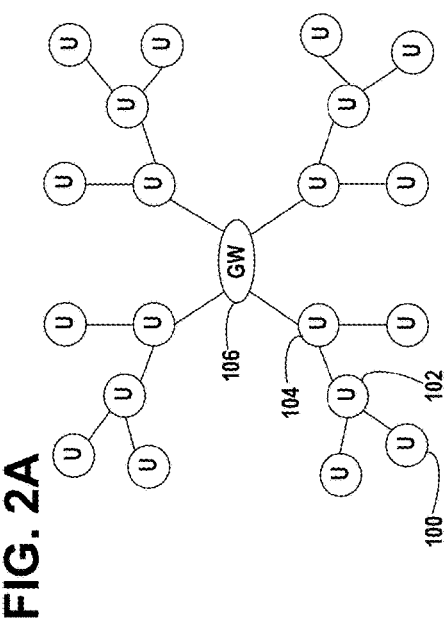
FIG. 2C is an example of the wireless network of FIG. 2B, wherein a cascading effect is triggered, since the node 104 that now has hop count 1, advertises its hop count, which causes nearby nodes, such as node 102, to update their hop counts to 2.

FIG. 2C is an example of the wireless network of FIG. 2B, wherein a cascading effect is triggered, since the node 104 that now has hop count 1, advertises its hop count in an advertising packet, which causes nearby nodes, such as node 102, to update their hop counts to 2. Nodes receiving the advertising packet, such as node 102, may also utilize the RSSI of the advertising packet, in such way that only advertising packets above a certain RSSI threshold are taken into account and respective hop value updated.

Figure 2D:
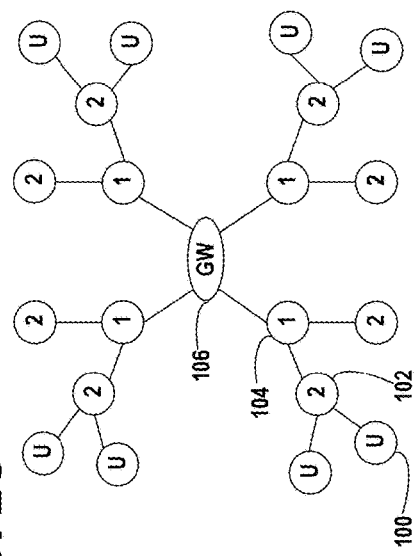
FIG. 2D is an example of the wireless network of FIG. 2C, wherein the cascading effect continues, since the node 102 that now has hop count 2, advertises its hop count, which causes nearby nodes, such as node 100, to update their hop counts to 3.

FIG. 2D is an example of the wireless network of FIG. 2C, wherein the cascading effect continues, since the node 102 that now has hop count 2, advertises its hop count, which causes nearby nodes, such as node 100, to update their hop counts to 3. Eventually, every device in the wireless network, except GW, advertises its hop count, which indicates how many hops away it is from a GW device. GW may advertise a hop count 0. At that point, information data objects created by the nodes may start moving towards the GW.

In accordance with an example embodiment of the invention, after the wireless network has self-organized, any device or node in the network may use multi-hop communications, to send data to the centralized gateway (GW). Advertiser nodes in the network send advertising messages to advertise their existence and capabilities. The BLE advertising messages include the advertisement interval, hop count value, and possible other data, such as battery status and buffer information.

In accordance with an example embodiment of the invention, a node in the network, which determines that it has information to send to the gateway GW, will scan to receive the advertising messages, and will extract the advertisement interval and hop count. The wireless scanner node will select a wireless advertising node that has a received hop count value that is less than the hop count value of the scanner node. The scanner memorizes the address of the advertising node and then enters a sleep mode until the following advertisement event, based on advertisement interval indicated in the advertising packet.

In accordance with an example embodiment of the invention, the scanner node awakes from the sleep mode in the advertisement event and connects with the advertising node. The scanner node then transmits to the advertising node, a wireless message including the data or information for forwarding by the advertising node to the gateway GW node. By the scanner node entering the sleep mode until the next advertising event, instead of immediately connecting to the advertiser node, the scanner node saves the power that would otherwise have been consumed in remaining awake for the next advertising event.

In accordance with an example embodiment of the invention, after the advertiser node has received the data or information that is to be forwarded to the GW, the advertiser node now must forward the data or information to the GW. The advertising node, now referred to as the forwarding node, also receives advertising packets from other nodes in the network, which have a hop count value that is less than the hop count value of the forwarding node. The forwarding node selects a node having a received hop count value that is less than the hop count value of the forwarding node. The forwarding node memorizes the address of the selected node and then then enters a sleep mode until the next advertising event of the selected node. The forwarding node then awakes from the sleep mode in the advertising event of the selected node and connects with the selected node. The forwarding node transmits to the selected node, a wireless message including the data or information for forwarding by the selected node to the gateway GW node.

In accordance with an example embodiment of the invention, if the selected node has a hop count of one (1), it is nearest to the GW. A node with a hop count of one does not scan for other advertising packets, but instead transmits its own advertising packet signifying to the GW that it has data to be polled by GW. The GW is programmed to respond by polling for the data from the node with a hop count of one.

The GW node 106 will scan for nodes, such as node 104, sending advertisement packets with a hop count of one. The GW node 106 receives advertising packets including a hop count of one, from the selected wireless device node 104, indicating that data is available from the selected wireless device, for polling by the GW node 106.

The GW node 106 transmits to the selected wireless device node 104, a polling message to request the data.

The GW node 106 receives a message from the selected wireless device node 104, including the data, in response to the polling message.

Figure 3:
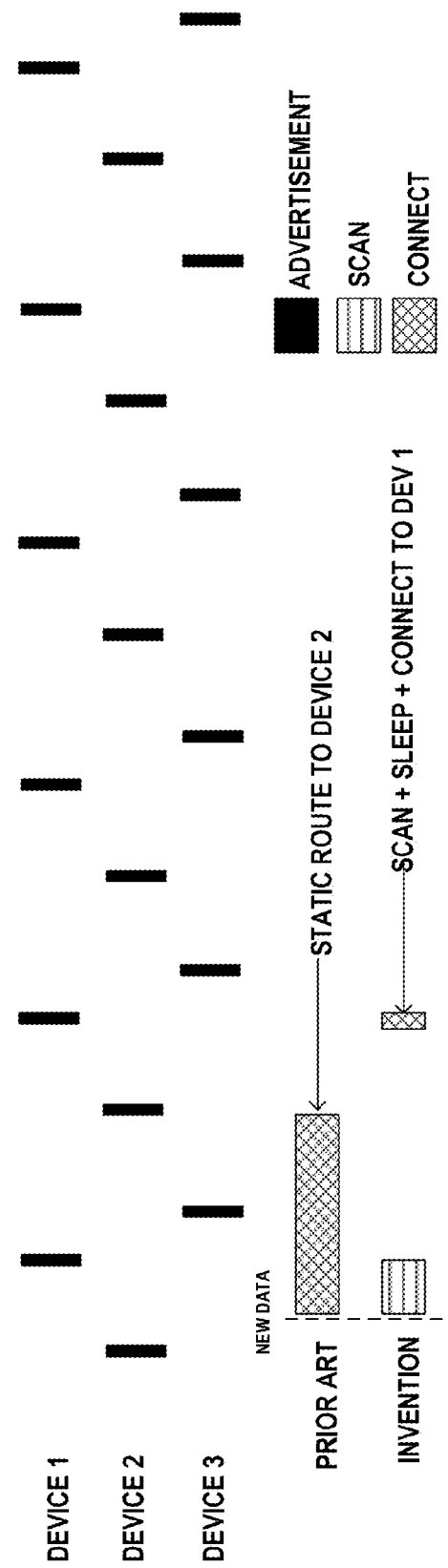
FIG. 3 illustrates performing device discovery first instead of a connection setup. When the device fulfilling requirements is found in the device discovery, the node device is put into sleep mode for the advertisement interval of the found device and the connection creation is started just before expected advertisement interval start time, in accordance with an example embodiment of the invention.

FIG. 3 illustrates performing device discovery first instead of a connection setup. When the device or node fulfilling requirements is found by the scanning node in the device discovery, the scanning node is put into sleep mode until the advertisement event of the found node and the connection creation is started in the next expected advertisement event start time. Thus, the active and power consuming reception time is decreased in case there are at least two nodes in the range. The network adaptation is much faster, i.e. nodes discover the change in the hop values during every connection setup. In the case shown in FIG. 3, with no packet errors, the average reception time required for every connection setup is roughly cut in half.

Figure 4:
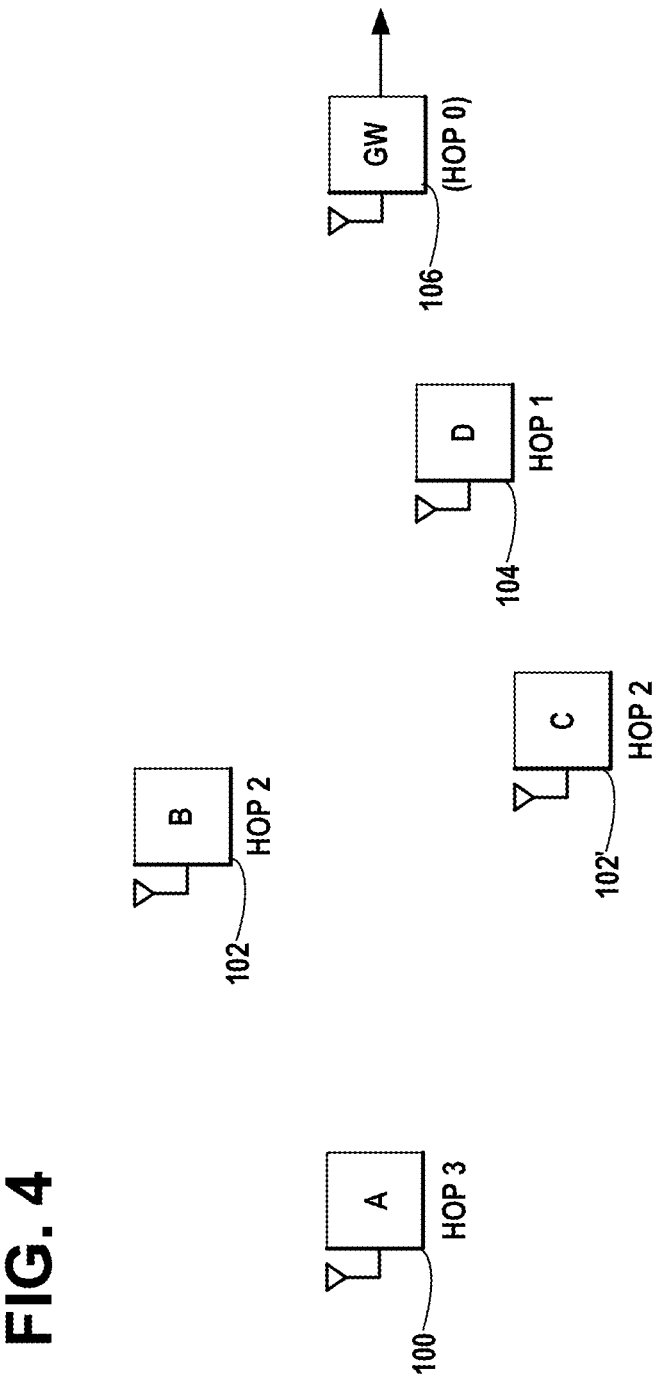
FIG. 4 shows an example environment for the hop delivery mechanism in a wireless network, such as a wireless mesh network, in accordance with an example embodiment of the invention.

FIG. 4 shows an example environment for the hop delivery mechanism in a wireless network, such as a wireless mesh network. In accordance with an example embodiment of the invention, device or node A 100 is receiving an advertisement from node B 102 and probably node C 102', because they both are advertising hop 2, and node A is advertising hop 3. The B and C nodes both hear node D 104 and hence they are advertising hop 2. Node D has been heard by the GW 106 and the GW has set hop 1 in node D. Hence node D advertises hop 1. The GW node is effectively hop 0, and may advertise this hop count, if needed.

In accordance with an example embodiment of the invention, in case node A 100 wants to send something to GW 106, it will first start a device discovery trying to discover other nodes capable of delivering the data and having the lower hop value than its current value. When the node A 100 discovers node B 102, C 102' or D 104, it will determine if other conditions for connections are matched, such as whether there is room in the data buffers, the RSSI level, battery status or whether the node is willing to deliver data, for example due to a low battery. When a node 100 discovers a suitable node 102, it will memorize the information required for a connection creation with the node 102 and then enter into sleep mode until the next advertisement event of the found node 102. The advertisement interval may be received in the advertisement packet (it may have its own AD type=0x1A or the interval may be added to data of the some UUID), or the interval may otherwise be known by the node 100. The node 100 may know the advertisement interval, for example, because it has been preconfigured into memory or the interval may have been detected during a previous discovery process or connection phase (for example by reading it from a GATT table).

In accordance with an example embodiment of the invention, when node A 100 has data to be sent to the GW, node A will perform device discovery and it will find that nodes B and C both are advertising hop 2. Node A may decide, for example based on RSSI of the received advertisement packets, which one of the two nodes B or C, it will connect with and send the data. For example, if node A selects node B, then node A sends data to node B. When node B receives the data from node A (or from any node), it will deliver it further, to any node that has a smaller hop number than node B. For example, node B delivers the data to node D. The Node D, since it is a hop 1 node, will advertise that it has data available, which will trigger the GW to poll node D and read out the data.

In accordance with an example embodiment of the invention, there may be several rules for delivery, for example, [1]

the node with the highest RSSI may be selected, or [2] an RSSI must be above a certain limit, or [3] a node must have an "empty delivery" buffer, or [4] a node must have a smallest delivery ratio.

In accordance with an example embodiment of the invention, a node may indicate in an advertisement if it has room in its delivery buffer, which is a buffer where delivered data is stored until the node has successfully forwarded it. In addition, a node may indicate an advertisement delivery ratio, which describes how often device has delivered data.

Figure 5:
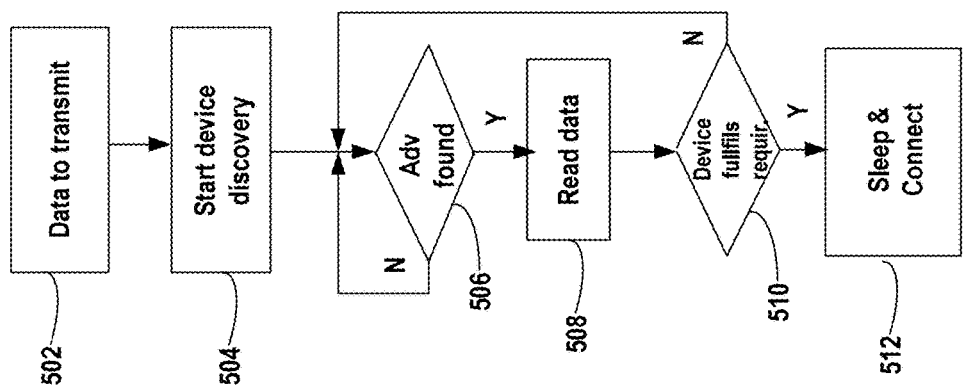
FIG. 5 shows one example process for the hop delivery mechanism, in accordance with an example embodiment of the invention.

FIG. 5 shows one example process for the hop delivery mechanism in accordance with an example embodiment of the invention. When the device or node 100 has data to transmit in step 502, it will perform a scan for device discovery in step 504. When advertisement packets for certain node 102 is found in step 506, e.g. a node 102 that supports hop counting and has a lower hop count value than node 100, the information in the packet relating to of that node 102 is read and memorized in step 508, especially its advertisement interval. If the found node 102 fulfills the requirements of the device discovery in step 510, then node 100 can enter sleep mode in step 512 until the next advertisement event of the found node 102. Then node 100 wakes ups and connects to the found node 102 in the next advertisement event.

Figure 6:
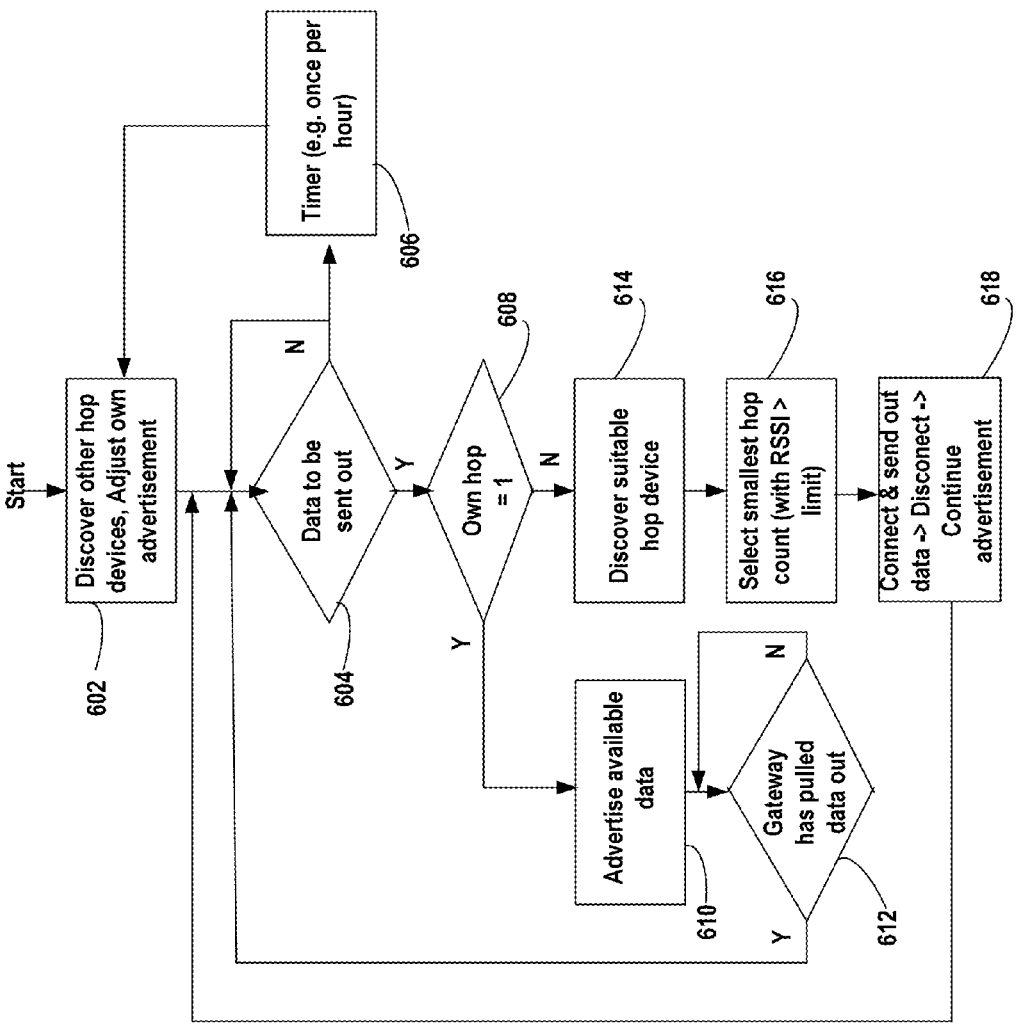
FIG. 6 shows an example process for the hop delivery mechanism, which includes a node performing an initial stage of self-organization and a final stage of where, if the node is a hop 1 node, it delivers the data to the GW, in accordance with an example embodiment of the invention.

FIG. 6 shows one example process for the hop delivery mechanism in accordance with an example embodiment of the invention, which includes a device or node performing an initial stage of self-organization in step 602 and a final stage of where, if the node is a hop 1 node, in step 608, it delivers the data to the GW in steps 610 and 612. When the node is started, it will scan to discover other nodes supporting hop counting, and receive node advertising with certain hop information, to self-organize itself in the mesh network. It does this by establishing its location in the mesh network with respect to the location of the GW, by establishing the number of hops distance from the GW. Different mesh network systems may be differentiated with network ID information provided in advertisements receive from other nodes. If a wanted advertisement is found, the node adjusts its own hop count value in its advertisements, according to hop counts found in other advertisements. Typically the node's own hop is set to be the "found hop number+1". Now node may advertise its own hop number.

In accordance with an example embodiment of the invention, when node has data to be sent out in step 604, it will perform device discovery in step 614 and/or connection creation to find another node with a smaller hop number than its own, with optionally some other criteria, such as a certain RSSI requirement in step 616. Then the node connects to the found node in step 618 and sends out its data, with some identification information, e.g. its node id. The node may periodically check and adjust its timing in step 606.

Figure 7:
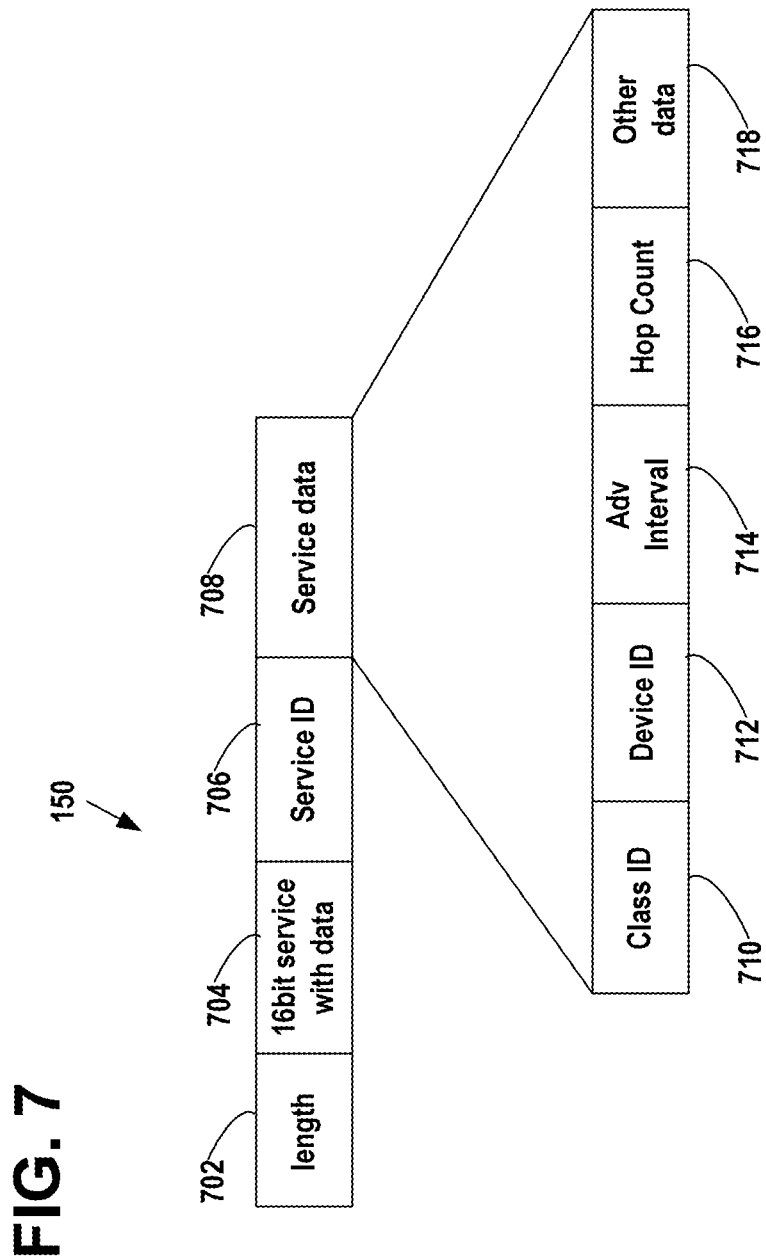
FIG. 7 shows an example content of an advertising packet, which includes the advertisement interval, hop information and possible other data, such as battery status and buffer information, in accordance with an example embodiment of the invention.

FIG. 7 shows an example content of an advertising packet 150 in accordance with an example embodiment of the invention, which includes the advertisement interval, hop information and possible other data, such as battery status and buffer information. The example advertising packet may include length 702, 16 bit service with data 704, service ID 706, and service data 708. The service data may include class ID 710, device ID 712, advertising interval 714, hop count of the sender 716, and other data 718.

Figure 8:
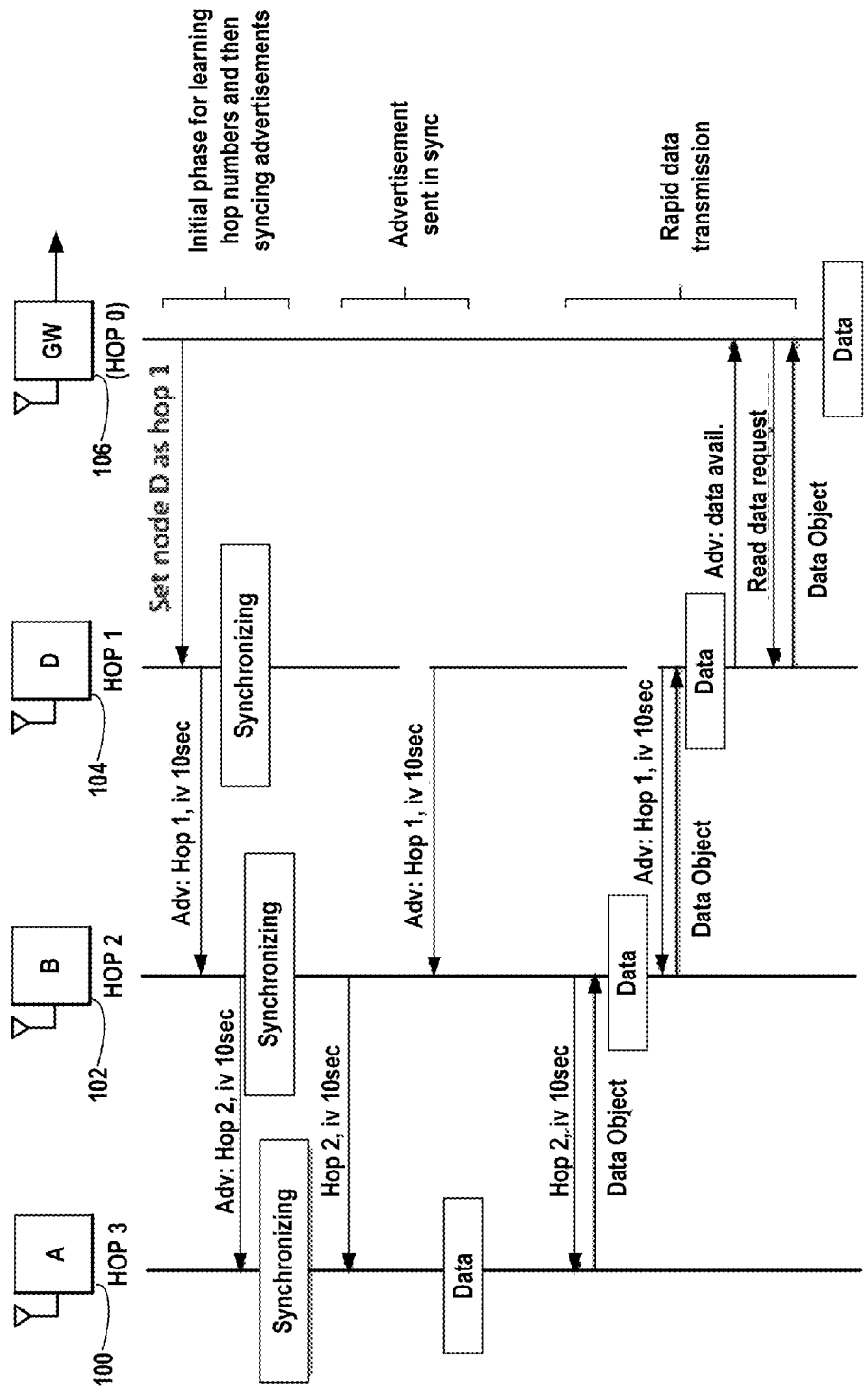
FIG. 8 shows a sequence diagram for the hop delivery mechanism wireless network, such as a wireless mesh network, in accordance with an example embodiment of the invention. The network includes three nodes performing an initial stage of self-organization, an intermediate stage where advertisement packets are sent by the nodes, and a final data delivery stage where the hop 1 node delivers the data to the GW, in accordance with an example embodiment of the invention.

FIG. 8 shows a sequence diagram for the hop delivery mechanism in a wireless network, such as a wireless mesh network, in accordance with an example embodiment of the invention. The network includes three devices or nodes performing an initial stage of self-organization, an intermediate stage where advertisement packets are sent by the nodes, and a final data delivery stage where the node hop 1 node delivers the data to the GW.

The three nodes D 104, B 102, and A 100 scan to discover other nodes supporting hop counting, and receive node advertising with certain hop information, to self-organize themselves in the mesh network by establishing their respective hop count values with respect to the location of the GW 106. In accordance with an example embodiment of the invention, when the hop-1 node D 104 sends its advertisement with hop count 1, it can also include information that it is transmitting at 10 second intervals. This will allow node B to adjust its advertisements, with hop count 2, to go out 2 seconds before an estimated transmission of GW node advertisement. When all nodes in the mesh network use the same strategy, data from node A is transmitted faster than using random advertisement moments.

When node A 100 wants to send something to GW 106 it will start device discovery to discover other nodes having the lower hop value than its current value. When a node 100 discovers a suitable node 102, it will memorize the information required for a connection creation with the node 102 and then enter into sleep mode until the next advertisement event of the found node 102.

When nodes D 104 with a hop count 1, receives the data from node B 102, since node D is near to the GW, it will not automatically forward the data to the GW. Instead, node D 104 with a hop count of 1 will advertise that data is available for polling by the GW. The GW node scans for nodes having a hop count of 1 indicating they have data to read. When the GW discovers a node D 104 having data to be read, the GW will poll the node D 104 for the data.

Figure 9A:
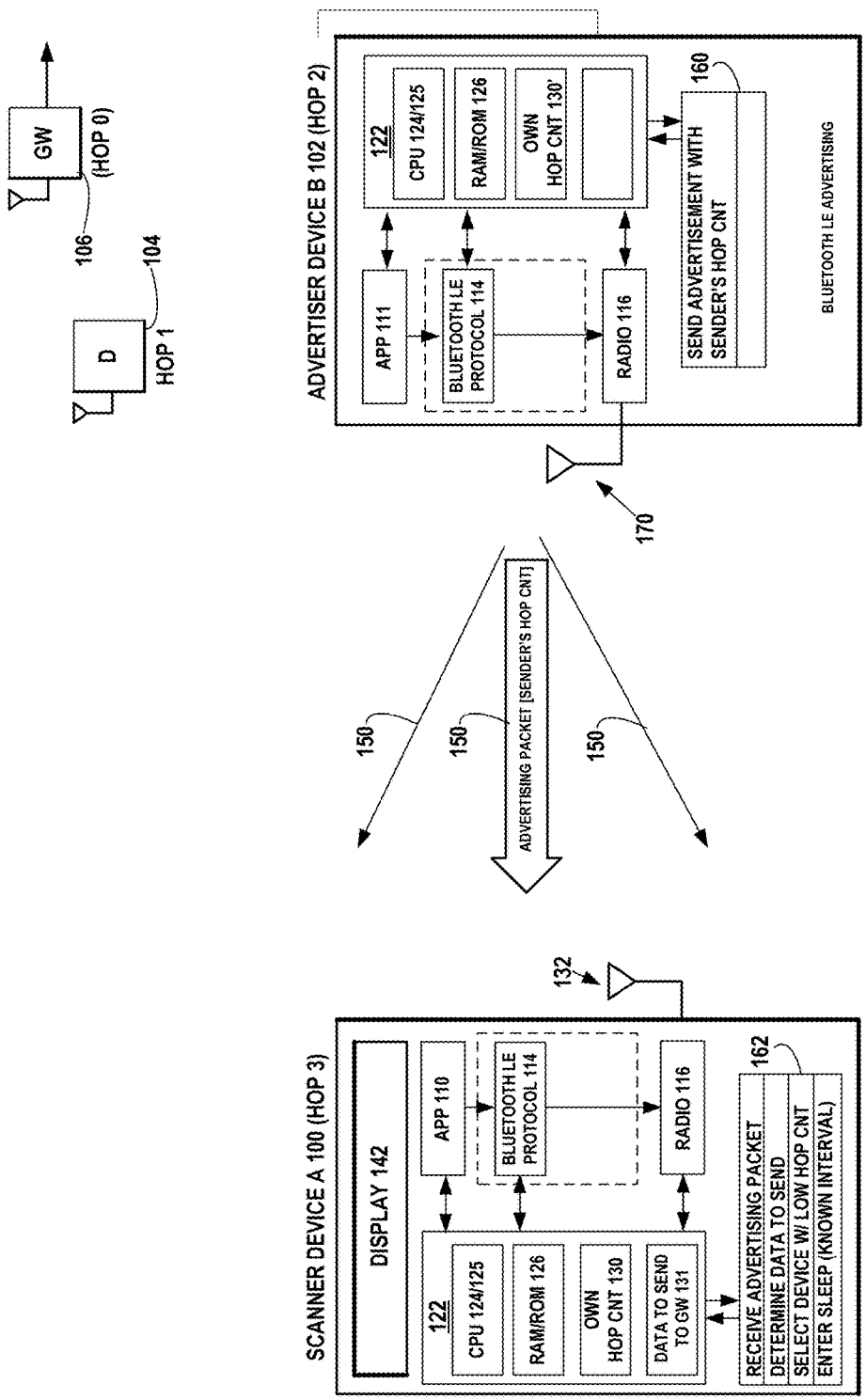
FIG. 9A is an illustration of an example embodiment of a network with an example wireless advertiser device and a wireless scanner device, wherein the wireless scanner device is shown scanning for Bluetooth™ Low Energy protocol (BLE) advertising messages, in accordance with an example embodiment of the invention.

FIG. 9A is an illustration of an example embodiment of a network with an example wireless advertiser device or node B 102 and a wireless scanner device or node A 100. The wireless scanner node A 100 is shown scanning for Bluetooth™ Low Energy protocol (BLE) advertising messages 150. The advertiser node B 102 is shown broadcasting BLE advertising messages 150 over any of the 3 advertising PHY channels used by nodes to advertise their existence and capabilities. The BLE advertising messages 150 include the advertisement interval, hop count value of 2, and possible other data, such as battery status and buffer information of the advertiser node B 102. The scanner node A 100 is shown receiving the advertising messages 150, extracting the advertisement interval and hop count.

The scanner node A 100 is shown determining that it has information to send to the gateway GW or central wireless node. The wireless scanner node A 100 selects the wireless advertising node B 102 having a received hop count value of 2 that is less than the hop count value of 3 of the scanner A 100. The scanner A 100 memorizes the address of the advertising node B 102 and then enters a sleep mode until the next advertisement event based on advertisement interval indicated in the advertising packet 150 transmitted by the advertising node B 102.

The scanner node A 100 awakes from the sleep mode before the advertisement event and connects with the advertising node B 102. The scanner node A 100 transmits to the advertising node B 102, a wireless message the message including the data or information for forwarding by the advertising node B 102 to the gateway GW node 106.

Figure 11:
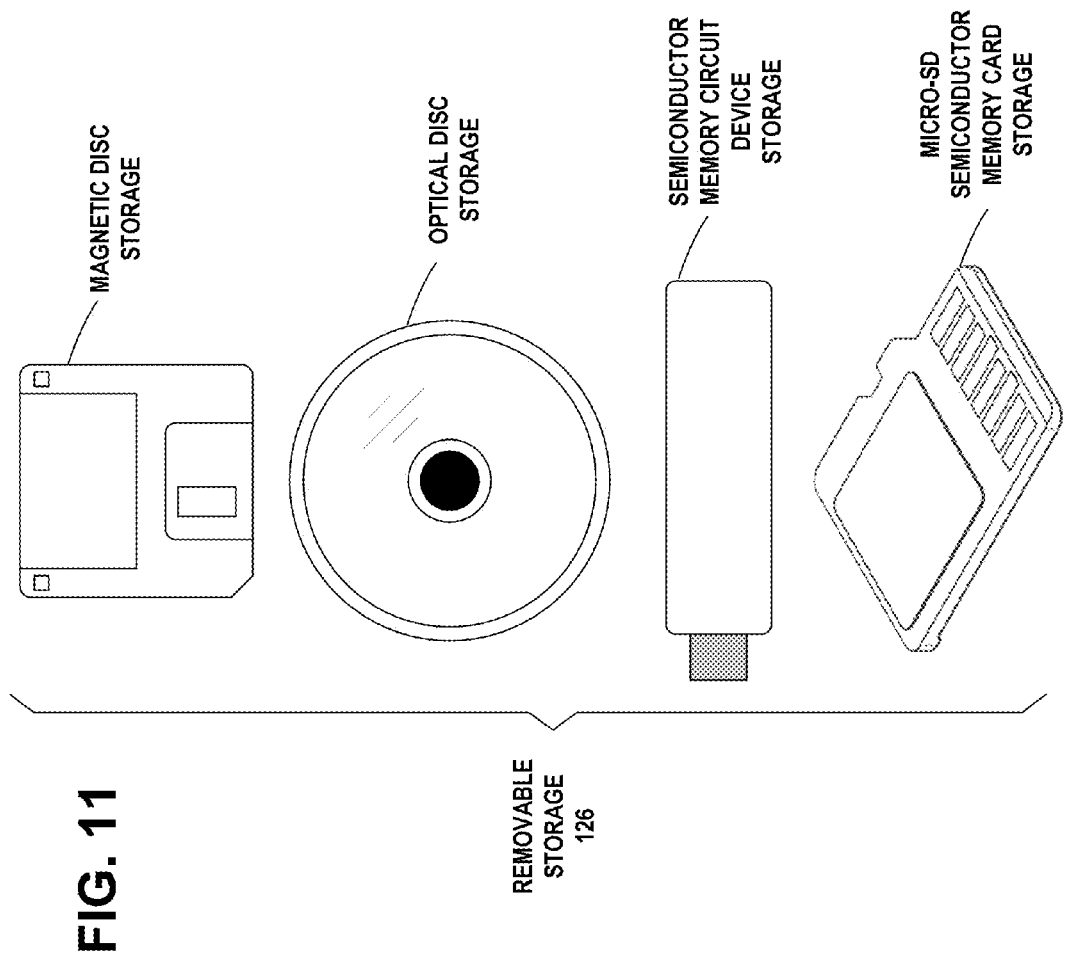
FIG. 11 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the scanner node A 100, the advertiser node B 102, and the wireless gateway (GW) or node 106 may include a processor 122 that includes from one to many central processing units (CPUs) 124 and/or 125, a random access memory (RAM)/a read only memory (ROM) 126, and interface circuits to interface with one or more radio transceivers 116, antenna 132, 170, and battery or house power sources. The wireless mobile node A 100 may include a keypad, display 142, etc. The RAM and ROM can be removable memory devices such as smart cards, SIMs, WIMs, semiconductor memories such as RAM, ROM, PROMS, flash memory devices, etc., as shown in FIG. 11. In an example embodiment of the invention, the RAM 126 or buffer 162 in the scanner node A 100 may store the default service information contained in received advertising messages 150, for example, a description of the capabilities of the sending node B 102 in received advertising messages 150.

In an example embodiment of the invention, the Bluetooth scanner node A 100, the wireless node B 102, and the wireless gateway (GW) or node 106 include the Bluetooth™ Low Energy protocol (BLE) 114.

In an example embodiment of the invention, the scanner node A 100 and/or the advertiser node B 102 and/or the wireless gateway (GW) or node 106 may be, for example, a miniature device such as a key fob, smart card, jewelry, or the like. In an example embodiment of the invention, the scanner node A 100 and/or the advertiser node B 102 and/or the wireless gateway (GW) or node 106 may be, for example, a relatively larger cell phone, smart phone, flip-phone, PDA, graphic pad. The scanner node A 100 and/or the advertiser node B 102 and/or the wireless gateway (GW) or node 106 may also be in an automobile or other vehicle. In embodiments, the relative sizes of nodes A 100, B 102, and GW 106 may be arbitrary.

Figure 9B:
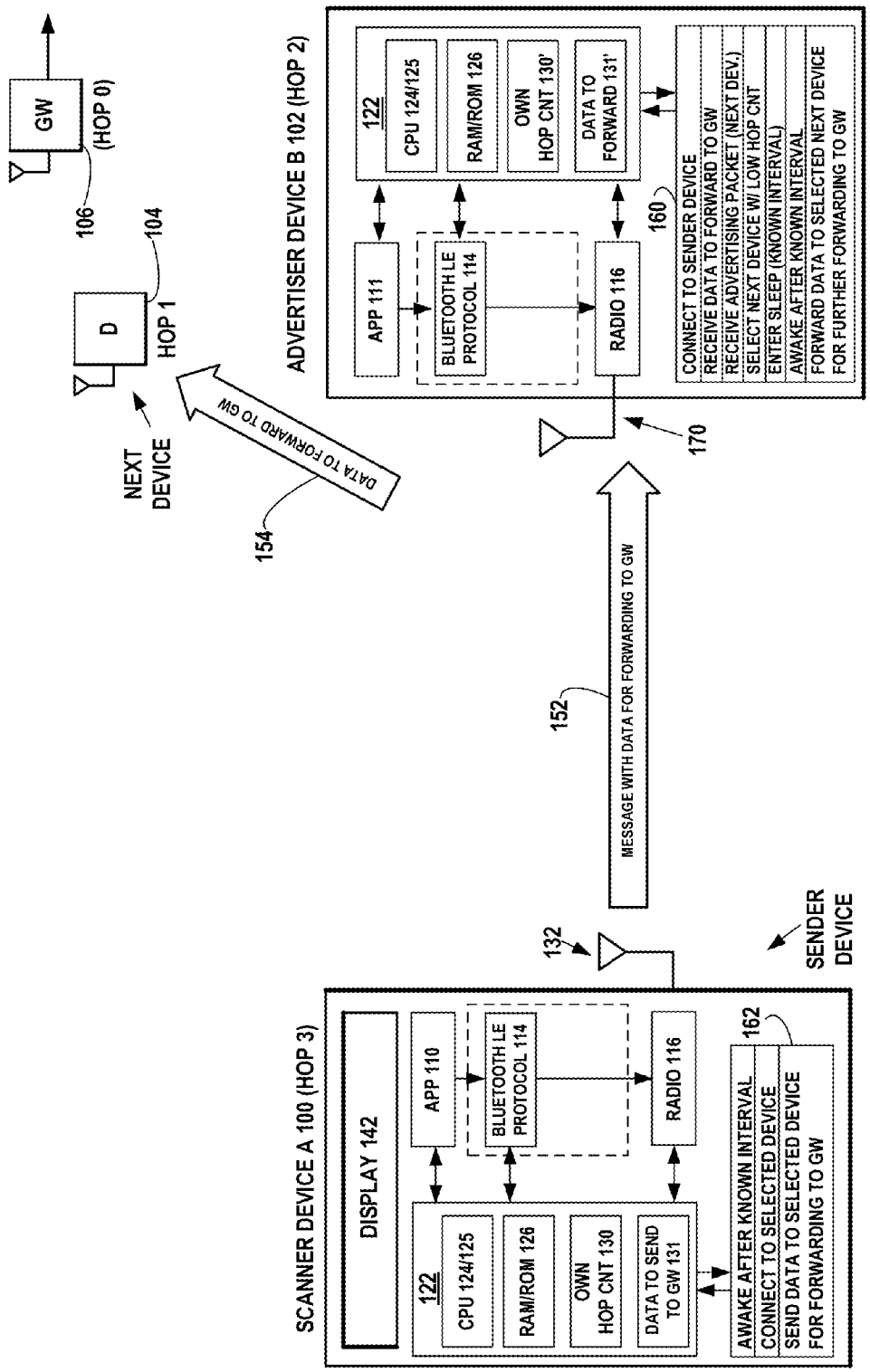
FIG. 9B is an illustration of an example embodiment of the network of FIG. 1A, wherein the advertising device is shown receiving a wireless message from the scanner device A that includes data or information that is to be forwarded to the GW.

FIG. 9B is an illustration of an example embodiment of the network of FIG. 1A. The advertising device or node B 102 is shown receiving a wireless message 152 from the scanner device or node A 100 that includes the data or information that is to be forwarded to the GW 106.

The node B 102 also receives advertising packets from the node D 104 having a hop count value of 1, which is less than the hop count value of 2 of the node B 102. The node B 102 selects the node D 104 having a received hop count value of 1 that is less than the hop count value of 2 of the node B 102. Node B 102 memorizes the information required for a connection creation with selected node D 104 node. Node B 102 then enters a sleep mode until the next advertising event of node D 104.

Node B 102 awakes from the sleep mode in the advertising event of node D 104 and connects with the node D 104. Node B 102 transmits to the node D 104, a wireless message 154 including the data or information for forwarding by the node D 104 to the gateway GW node 106.

Figure 10:
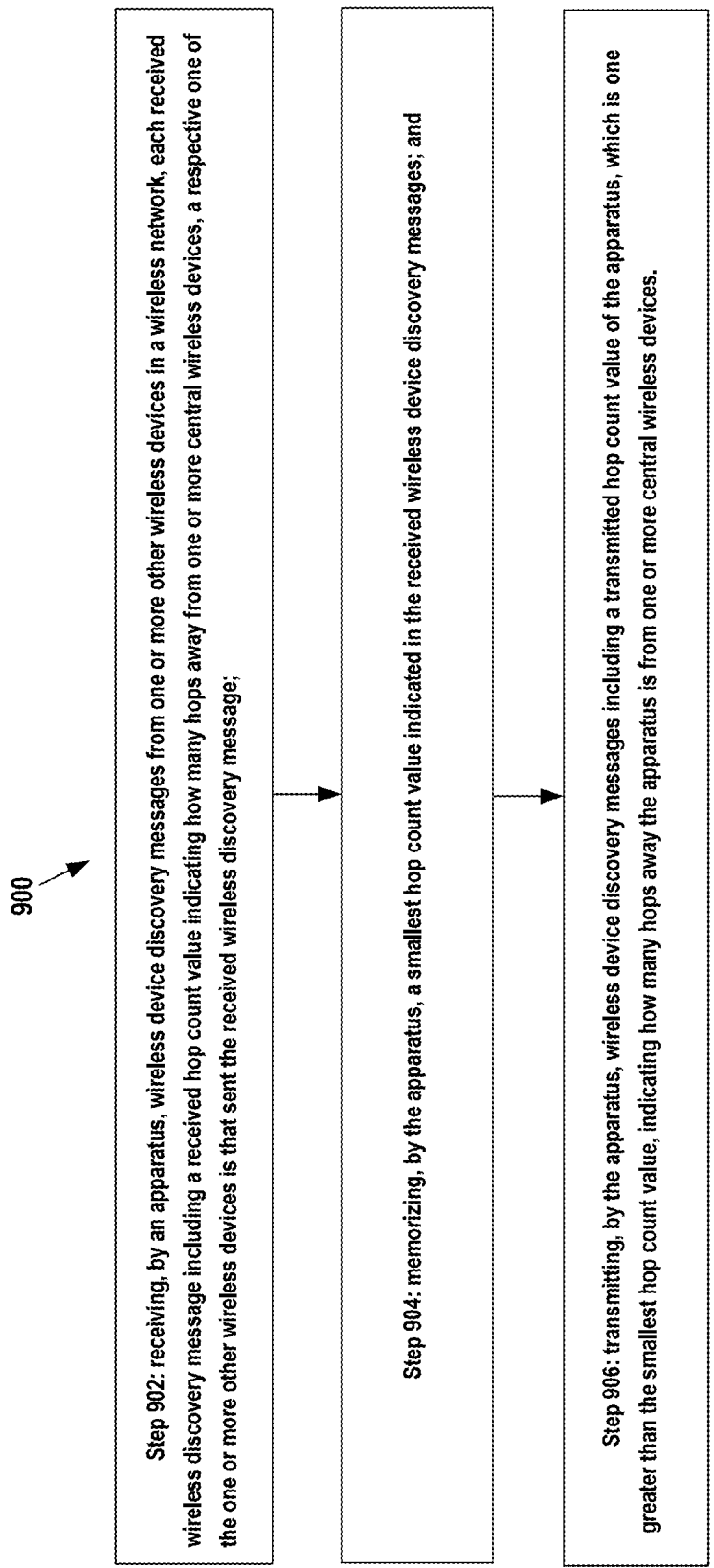
FIG. 10 is an illustration of an example flow diagram of an example process in the wireless scanner device or node, carrying out the example operations, in accordance with at least one embodiment of the present invention.

FIG. 10 is an illustration of an example flow diagram 900 of an example process in the wireless scanner device or node 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 902: receiving, by an apparatus, wireless device discovery messages from one or more other wireless devices in a wireless network, each received wireless discovery message including a received hop count value indicating how many hops away from one or more central wireless devices, a respective one of the one or more other wireless devices is that sent the received wireless discovery message;

Step 904: memorizing, by the apparatus, a smallest hop count value indicated in the received wireless device discovery messages; and Step 906: transmitting, by the apparatus, wireless device discovery messages including a transmitted hop count value of the apparatus, which is one greater than the smallest hop count value, indicating how many hops away the apparatus is from one or more central wireless devices.

FIG. 10A is an illustration of an example flow diagram 1000 of an example process in the wireless scanner device or node 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1002: determining, by an apparatus, that it has information to deliver to one or more central wireless devices in a wireless network that includes one or more other wireless devices;

Step 1004: selecting, by the apparatus, a wireless device of the one or more other wireless devices, the selected wireless device having a smaller hop count from the one or more central wireless devices, than a hop count of the apparatus from the one or more central wireless devices;

Step 1006: entering, by the apparatus, a sleep mode based on a known repetition interval of wireless device discovery messages received from the selected wireless device;

Step 1008: awaking, by the apparatus, from the sleep mode based on the known repetition interval of wireless device discovery messages of the selected wireless device; and Step 1010: creating, by the apparatus, a connection with the selected wireless device and transmitting to the selected wireless device the information for delivery to the one or more central wireless devices via the connection.

FIG. 10B is an illustration of an example flow diagram 1050 of an example process in the wireless advertiser device or node 102, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1052: receiving, by an apparatus, a wireless message from a wireless sender device in a wireless network that includes an indication of one or more central wireless devices to which information in the wireless message is to be delivered;

Step 1054: receiving, by the apparatus, wireless device discovery messages from one or more other wireless devices in a wireless network, each received wireless discovery message including a received hop count value indicating how many hops away from one or more central wireless devices, a respective one of the one or more other wireless devices is that sent the received wireless discovery message;

Step 1056: selecting, by the apparatus, a wireless device of the one or more other wireless devices, the selected wireless device having a smallest hop count value to the one or more central wireless devices and memorizing information required for creating a connection with the selected wireless device;

Step 1058: entering, by the apparatus, a sleep mode based on a known repetition interval of wireless device discovery messages transmitted by the selected wireless device; and Step 1060: awaking, by the apparatus, from the sleep mode based on the known repetition interval of wireless device discovery messages, and transmitting to the selected wireless device, a wireless message including the information for delivery to the one or more central wireless devices.

FIG. 10C is an illustration of an example flow diagram 1080 of an example process in the wireless gateway (GW) or node 106, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1082: receiving, by an apparatus, wireless device discovery messages from one or more other wireless devices in a wireless network, each received wireless discovery message including a maximum hop count value indicating how many hops away from the apparatus, a respective one of the one or more other wireless devices is that sent the received wireless discovery message;

Step 1084: selecting, by the apparatus, a wireless device of the one or more other wireless devices, the selected wireless device having a highest RSSI level for wireless device discovery messages received from the selected wireless device; and Step 1086: transmitting, by the apparatus, an indication to the selected wireless device, indicating that the selected wireless device is closest to the apparatus of the one or more other wireless devices in the wireless network, the indication causing the selected wireless device to store a hop count of one therein, indicating there is one wireless connection required to deliver data to the apparatus.

FIG. 10D is an illustration of an example flow diagram 1100 of an example process in the wireless gateway (GW) or node 106, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 1102: receiving, by the apparatus, wireless device discovery messages including a hop count of one from the selected wireless device, indicating that data is available from the selected wireless device, for polling by the apparatus;

Step 1104: transmitting, by the apparatus, to the selected wireless device, a polling message to request the data; and Step 1106: receiving, by the apparatus, a message from the selected wireless device, including the data, in response to the polling message.

FIG. 11 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In accordance with an example embodiment of the invention, it is also possible that the node first attempts to create the connection to a memorized device (for example the device selected in the last discovery procedure), and if connection creation fails, then triggering device discovery. The device may check after the connection is created, if the hop count is still smaller than its own value. In case the hop count is not smaller, then the device may perform a new device discovery. If the hop count is smaller and the difference is more than one, the device may adjust its own value to the found hop count plus one. The device may also perform a partial device discovery (selecting a first device) or full device discovery (selecting the lowest hop count) occasionally to detect network changes to balance load, even though it typically connects to a memorized device. The device may also have a built in feature to connect (for example) to a first device, which has the smaller hop count. In some cases the device may have several data objects to write at one event, some objects of which may be originated by the device itself, and some written to the device by other devices further away from GW Device.

In accordance with an example embodiment of the invention, nodes with a hop count 1, which are near to the GW, will not automatically forward data to the GW. Instead, nodes with a hop count of 1 will advertise that data is available for polling by the GW. The GW device scans for nodes having a hop count of 1 indicating they have data to read. When the GW discovers a hop 1 node having data to be read, the GW will poll the hop 1 node for the data. In accordance with an example embodiment of the invention, the GW may not scan, for example if it is, itself, battery powered.

In accordance with an example embodiment of the invention, the GW also scans for uninitialized nodes or nodes that have a large hop number, which should be renumbered to become hop 1 nodes.

In accordance with an example embodiment of the invention, latency is improved by sending the advertisements at specific times so that data towards the GW device flows as fast as possible. Each device in the wireless mesh will send its advertisement a little bit sooner (e.g. 100 ms) than the device with the next higher hop count expects. This will allow rapid uplink data traversal to the GW and will minimize a need to keep data in buffers.

In accordance with an example embodiment of the invention, nodes that are not power constrained may send advertisements with a rapid phase (faster than nodes with power constraints), and thus minimize the time battery powered nodes with a hop count larger than 1, need to be in the scanning mode looking for another node to which to write data.

In accordance with an example embodiment of the invention, number of bytes may be optimized, since the data sent does not need to include a destination address, but only an identifier of the original sender node. All data is collected by the GW for further processing.

Advantages of Embodiments of the Invention

Example embodiments of the invention enable low power data delivery and collection from set of devices, typically with BLE devices, without requiring any complex mesh network protocols. This approach optimizes the BLE system for collecting data. Power cost and code complexity are optimized.

In example embodiments of the invention, no connections are kept active, and no flooding of messages are used. Minimal header data is needed for optimal use of Bluetooth LE.

Example embodiments of the invention support security, since all advertisements may be encrypted with pre-shared keys. Data objects may also be encrypted, and hence data from nodes may be transmitted to a cloud server through other nodes and the GW, while maintaining the data secure.

In example embodiments of the invention, the latency through the system is determined by the interval and sequence in which "hop count" advertisements are actually sent. Example embodiments of the invention improve latency by chaining the sending of advertisements. Otherwise, if advertisements were sent by each device at ten second intervals, it might take fifty seconds or more for data to get through five hops.

In example embodiments of the invention, power costs are minimized by the hop-1 nodes, i.e. those immediately adjacent to the GW, which need not discover other nodes to which to write data. Power costs are also minimized by the hop-1 nodes, since they only scan when nothing has been heard from the GW for a long enough time. The scanning is a very power consuming activity, and hence this saves a lot of energy.

In example embodiments of the invention, the Hop-1 nodes do not forward data, but instead making it available for the GWs to pull, which enables set of very useful features:

Hop-1 nodes are more available for Hop>1 nodes, as hop-1s are not spending time on device discovery and connection creation activities.

GW buffering pressure is relieved a bit, as GW can poll data from hop 1 nodes when it has buffer space available.

Hop-1 node power save: hop-1 nodes don't need to perform discovery (or discover very seldom), as they are being polled by gateways. This helps to address the problem of high resource consumption by nodes close to the GW. The hop-1 nodes don't need to discover (hop-2 and higher nodes whereas the GW does), so hop-1 nodes provide power save benefits in compensation for being heavy data forwarders. The GW is often mains-powered or equipped with a large battery, and hence can afford the power needed to discover new nodes and data on hop-1. Thus, Hop-1 nodes save battery as they don't need to be discovering gateways, but they can trust that gateway will connect to them if one appears close by. This helps in the formation or reorganization of the network, as a new GW will push new hop settings to nodes and when the gateway is not present nodes do not perform discovery.

GW may be discovering legacy devices as well, e.g. if gateway is implemented in a smart phone, and hence it is very natural to discover mesh nodes at the same time, rather than advertising and awaiting mesh nodes to connect to the gateway.

Multiple GWs can be deployed close to each other without mesh nodes needing to know, i.e. nodes may have multiple GWs that serve them without nodes needing to know. This provides:

Improved reliability in case of single GW failure (seamless handoff so to speak—easy GW replacement).

Load-balancing—multiple GWs can poll the same hop-1 nodes.

Simple topology/no extra messaging for multiple GWs—multiple GWs exist seamlessly to mesh nodes and no routing problems appear.

Moving GWs—GWs can come and go easily.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

establishing, by an apparatus, the apparatus' location in a wireless network with respect to a location of one or more central wireless devices in the wireless network, by receiving Bluetooth LE advertising messages from other wireless devices in the wireless network and adjusting the apparatus' own hop count value to be one greater than a smallest hop count value indicated in the received advertising messages from the other wireless devices, the apparatus thereafter periodically transmitting Bluetooth LE advertising packets with the adjusted hop count of the apparatus to other devices in the network;

determining, by the apparatus, that it has information to deliver to the one or more central wireless devices in the wireless network that includes one or more other wireless devices;

scanning, by the apparatus, for Bluetooth LE advertising messages from the one or more other wireless devices and selecting, by the apparatus, a wireless device of the one or more other wireless devices, the selected wireless device having a smaller hop count from the one or more central wireless devices, than a hop count of the apparatus from the one or more central wireless devices, wherein there is no connection between the apparatus and the selected wireless device during the scanning and the selecting;

entering, by the apparatus, a sleep mode based on a known advertisement repetition interval of wireless device Bluetooth LE advertising messages received from the selected wireless device;

awaking, by the apparatus, from the sleep mode based on the known advertisement repetition interval of wireless device Bluetooth LE advertising messages of the selected wireless device; and creating, by the apparatus, a connection with the selected wireless device and transmitting the information to the selected wireless device for forwarding the information to a further wireless device of the one or more other wireless devices for delivery of the information to the one or more central wireless devices via the connection;

wherein the apparatus and the selected wireless device do not establish the connection until the connection is created by the apparatus and the selected wireless device for the apparatus to transmit the information to the selected wireless device for forwarding the information by the selected wireless device to the further wireless device for delivery to the one or more central wireless devices.

2. The method of claim 1, wherein the apparatus wirelessly connects to the selected wireless device after awaking from the sleep mode, and then transmits to the selected wireless device.

3. The method of claim 1, wherein the known advertisement repetition interval of wireless device Bluetooth LE advertising messages transmitted by the selected wireless device, is at least one of: an advertisement interval indicated in advertising messages received by the apparatus from the selected wireless device, an interval indicated by an AD type of the advertising message received by the apparatus from the selected wireless device, an interval preconfigured in the apparatus' memory, or an interval detected by the apparatus from the selected wireless device during a previous discovery process or connection phase.

4. The method of claim 1, wherein the selecting of the selected wireless device further includes selecting a wireless device with a smallest hop count, if an RSSI of that device satisfies a predetermined threshold.

5. The method of claim 1, wherein when the hop count of the apparatus is one away from the one or more central wireless devices, the apparatus does not select a wireless device of the one or more other wireless devices, but instead the apparatus transmits one or more Bluetooth LE advertising messages indicating the information is available from the apparatus for polling by the one or more central wireless devices.

6. The method of claim 1, wherein the smaller hop count of the selected wireless device is determined by the apparatus based on the apparatus receiving Bluetooth LE advertising messages from the selected wireless device and other wireless devices, and wherein the selection by the apparatus of the wireless device is based on comparison by the apparatus of the hop count indications included in the received Bluetooth LE advertising messages.

7. The method of claim 1, wherein the known advertisement repetition interval of wireless device Bluetooth LE advertising messages-received by the apparatus from the selected wireless device is included in an indication in the received Bluetooth LE advertising messages.

8. The method of claim 1, wherein the connection by the apparatus with the selected wireless device is a Bluetooth LE connection.

9. An apparatus, comprising:
at least one processor;
at least one memory including computer program code;
the at least one memory and the computer program code configured to, with the at least one processor, cause the apparatus at least to:
establish the apparatus' location in a wireless network with respect to a location of one or more central wireless devices in the wireless network, by receiving Bluetooth LE advertising messages from other wireless devices in the wireless network and adjusting the apparatus' own hop count value to be one greater than a smallest hop count value indicated in the received advertising messages from the other wireless devices, the apparatus thereafter periodically transmitting Bluetooth LE advertising packets with the adjusted hop count of the apparatus to other devices in the network;
determine that the apparatus has information to deliver to the one or more central wireless devices in the wireless network that includes one or more other wireless devices;
scan for Bluetooth LE advertising messages from the one or more other wireless devices and select a wireless device of the one or more other wireless devices, the selected wireless device having a smaller hop count from the one or more central wireless devices, than a hop count of the apparatus from the one or more central wireless devices, wherein there is no connection between the apparatus and the selected wireless device during the scanning and the selecting;
enter a sleep mode based on a known advertisement repetition interval of wireless device Bluetooth LE advertising messages received from the selected wireless device;
awake from the sleep mode based on the known advertisement repetition interval of wireless device Bluetooth LE advertising messages of the selected wireless device; and
create a connection with the selected wireless device and transmit the information to the selected wireless device for forwarding the information to a further wireless device of the one or more other wireless devices for delivery of the information to the one or more central wireless devices via the connection;
wherein the apparatus and the selected wireless device do not establish the connection until the connection is created by the apparatus and the selected wireless device for the apparatus to transmit the information to the selected wireless device for forwarding the information by the selected wireless device to the further wireless device for delivery to the one or more central wireless devices.

10. The apparatus of claim 9, wherein the apparatus wirelessly connects to the selected wireless device after awaking from the sleep mode, and then transmits to the selected wireless device.

11. The apparatus of claim 9, wherein the known advertisement repetition interval of wireless device Bluetooth LE advertising messages transmitted by the selected wireless device, is at least one of: an advertisement interval indicated in advertising messages received by the apparatus from the selected wireless device, an interval indicated by an AD type of the advertising message received by the apparatus from the selected wireless device, an interval preconfigured in the apparatus' memory, or an interval detected by the apparatus from the selected wireless device during a previous discovery process or connection phase.

12. The apparatus of claim 9, wherein the selecting of the selected wireless device further includes selecting a wireless device with a smallest hop count, if an RSSI of that device satisfies a predetermined threshold.

13. The apparatus of claim 9, wherein when the hop count of the apparatus is one away from the one or more central wireless devices, the apparatus does not select a wireless device of the one or more other wireless devices, but instead the apparatus transmits one or more Bluetooth LE advertising messages indicating the information is available from the apparatus for polling by the one or more central wireless devices.

14. The apparatus of claim 9, wherein the smaller hop count of the selected wireless device is determined by the apparatus based on the apparatus receiving Bluetooth LE advertising messages from the selected wireless device and other wireless devices, and wherein the selection by the apparatus of the wireless device is based on comparison by the apparatus of the hop count indications included in the received Bluetooth LE advertising messages.

15. The apparatus of claim 9, wherein the known advertisement repetition interval of wireless device Bluetooth LE advertising messages-received by the apparatus from the selected wireless device is included in an indication in the received Bluetooth LE advertising messages.

16. The apparatus of claim 9, wherein the connection by the apparatus with the selected wireless device is a Bluetooth LE connection.

17. A computer program product comprising computer executable program code recorded on a computer readable non-transitory storage medium, the computer executable program code comprising:
  code for establishing, by an apparatus, the apparatus' location in a wireless network with respect to a location of one or more central wireless devices in the wireless network, by receiving Bluetooth LE advertising messages from other wireless devices in the wireless network and adjusting the apparatus' own hop count value to be one greater than a smallest hop count value indicated in the received advertising messages from the other wireless devices, the apparatus thereafter periodically transmitting Bluetooth LE advertising packets with the adjusted hop count of the apparatus to other devices in the network;
  code for determining, by the apparatus, that it has information to deliver to the one or more central wireless devices in the wireless network that includes one or more other wireless devices;
  code for scanning, by the apparatus, for Bluetooth LE advertising messages from the one or more other wireless devices and selecting, by the apparatus, a wireless device of the one or more other wireless devices, the selected wireless device having a smaller hop count from the one or more central wireless devices, than a hop count of the apparatus from the one or more central wireless devices, wherein there is no connection between the apparatus and the selected wireless device during the scanning and the selecting;
  code for entering, by the apparatus, a sleep mode based on a known advertisement repetition interval of wireless device Bluetooth LE advertising messages received from the selected wireless device;
  code for awaking, by the apparatus, from the sleep mode based on the known advertisement repetition interval of wireless device Bluetooth LE advertising messages of the selected wireless device; and
  code for creating, by the apparatus, a connection with the selected wireless device and transmitting the information to the selected wireless device for forwarding the information to a further wireless device of the one or more other wireless devices for delivery of the information to the one or more central wireless devices via the connection;
  wherein the apparatus and the selected wireless device do not establish the connection until the connection is created by the apparatus and the selected wireless device for the apparatus to transmit the information to the selected wireless device for forwarding the information by the selected wireless device to the further wireless device for delivery to the one or more central wireless devices.

18. The computer program product of claim 17, wherein the smaller hop count of the selected wireless device is determined by the apparatus based on the apparatus receiving Bluetooth LE advertising messages from the selected wireless device and other wireless devices, and wherein the selection by the apparatus of the wireless device is based on comparison by the apparatus of the hop count indications included in the received Bluetooth LE advertising messages.

19. The computer program product of claim 17, wherein the known advertisement repetition interval of wireless device Bluetooth LE advertising messages received by the apparatus from the selected wireless device is included in an indication in the received Bluetooth LE advertising messages.

20. The computer program product of claim 17, wherein the connection by the apparatus with the selected wireless device is a Bluetooth LE connection.

* * * * *